United States Patent
Hatta et al.

(10) Patent No.: US 7,557,950 B2
(45) Date of Patent: Jul. 7, 2009

(54) PRINTING SYSTEM AND PRINTING METHOD

(75) Inventors: Atsushi Hatta, Nagano-ken (JP); Nobuhisa Takabayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 720 days.

(21) Appl. No.: 10/484,497

(22) PCT Filed: Jul. 23, 2002

(86) PCT No.: PCT/JP02/07413

§ 371 (c)(1),
(2), (4) Date: Jan. 24, 2005

(87) PCT Pub. No.: WO03/010955

PCT Pub. Date: Feb. 6, 2003

(65) Prior Publication Data

US 2005/0117948 A1    Jun. 2, 2005

(30) Foreign Application Priority Data

Jul. 23, 2001    (JP) ............................. 2001-222189
Jul. 23, 2001    (JP) ............................. 2001-222190

(51) Int. Cl.
*G06K 1/00* (2006.01)
(52) U.S. Cl. .................. 358/1.9; 358/3.23; 358/518; 358/520
(58) Field of Classification Search .............. 358/1.9, 358/3.23, 518, 520; 382/162, 167
See application file for complete search history.

(56) References Cited

U.S. PATENT DOCUMENTS 5,493,408 A    2/1996    Kurogane et al.
5,963,201 A    10/1999    McGreggor et al.

(Continued)

FOREIGN PATENT DOCUMENTS

EP    0806721 B1    11/1997

(Continued)

OTHER PUBLICATIONS

The supplementary partial European search report pp. 79-101 of "Adobe Photoshop 5.0 User Guide" 1998.

*Primary Examiner*—Kimberly A Williams
(74) *Attorney, Agent, or Firm*—Sughrue Mion, PLLC

(57) ABSTRACT

Disclosed is a printing system suitable for use at photo studio(s) and permitting printing of color photograph(s) as desired by user(s). Client machine(s) 5A, 5B may acquire photo image(s) from digital camera(s) 6 and may carry out editing (retouching and/or print layout/design editing) of photo image(s). At the start of editing, working color profile(s) may be set for photo image(s) editing operations, and color matching may be carried out on photo image(s) using color profile(s) for digital camera(s) 6 and working color profile(s). During editing, such photo image(s) may be displayed at monitor(s), at which time color matching may be carried out on such photo image(s) using monitor color profile(s) and color profile(s) for such photo image(s). After editing is completed, edited photo image(s) and working color profile(s) for same may be sent to print server machine(s) 2. Print server machine(s) 2 may carry out color matching using printer color profile(s) for output printer(s) and working color profile(s) for such photo image(s), may create print image(s) for such photo image(s), and may send such print image(s) to output printer(s) 3A and/or 3B.

10 Claims, 19 Drawing Sheets

U.S. PATENT DOCUMENTS

| | | |
|---|---|---|
| 6,281,992 B1 | 8/2001 | Kondo |
| 6,922,266 B2 * | 7/2005 | Hiramatsu .................. 358/518 |
| 7,227,666 B1 * | 6/2007 | MacLeod ..................... 358/1.9 |
| 7,256,911 B2 * | 8/2007 | Takabayashi et al. ........ 358/1.9 |
| 2001/0038468 A1 * | 11/2001 | Hiramatsu .................. 358/518 |
| 2002/0081040 A1 * | 6/2002 | Uchida ....................... 382/311 |
| 2003/0007191 A1 * | 1/2003 | Herbert ....................... 358/1.9 |
| 2003/0133076 A1 * | 7/2003 | Lehmeier et al. ............ 351/239 |

FOREIGN PATENT DOCUMENTS

| | | |
|---|---|---|
| EP | 0889391 B1 | 1/1999 |
| EP | 1098243 A1 | 5/2001 |
| EP | 1 231 772 A2 | 8/2002 |
| JP | 04264976 B1 | 9/1992 |
| JP | 05241746 B1 | 9/1993 |
| JP | 05292082 B1 | 11/1993 |
| JP | 09030057 B1 | 2/1997 |
| JP | 9-231353 A | 9/1997 |
| JP | 09274547 B1 | 10/1997 |
| JP | 09330192 B1 | 12/1997 |
| JP | 10028196 B1 | 1/1998 |
| JP | 10-51641 | 2/1998 |
| JP | 10187364 B1 | 7/1998 |
| JP | 10-224643 A | 8/1998 |
| JP | 10027076 B1 | 10/1998 |
| JP | 10315577 B1 | 12/1998 |
| JP | 10329392 BQ | 12/1998 |
| JP | 11069096 | 3/1999 |
| JP | 11099729 B1 | 4/1999 |
| JP | 11119600 B1 | 4/1999 |
| JP | 11298725 B1 | 10/1999 |
| JP | 11314439 B1 | 11/1999 |
| JP | 11355587 A | 12/1999 |
| JP | 2000-59638 A | 2/2000 |
| JP | 2000101771 B1 | 4/2000 |
| JP | 2000122833 B1 | 4/2000 |
| JP | 2000181655 B1 | 6/2000 |
| JP | 2000184145 B1 | 6/2000 |
| JP | 2000194239 B1 | 7/2000 |
| JP | 2000250726 B1 | 9/2000 |
| JP | 2000267201 B1 | 9/2000 |
| JP | 2000284920 B1 | 10/2000 |
| JP | 2000284938 B1 | 10/2000 |
| JP | 2001-14445 A | 1/2001 |
| JP | 2001075766 A1 | 3/2001 |
| JP | 2001121791 A1 | 5/2001 |
| JP | 2001125762 A1 | 5/2001 |
| JP | 2001-157069 A | 6/2001 |
| JP | 2001-169098 A | 6/2001 |
| JP | 2001195220 BQ | 7/2001 |
| JP | 2001205868 A1 | 7/2001 |
| JP | 2001218025 A1 | 8/2001 |
| JP | 2002-117101 A | 4/2002 |
| JP | 2002-237959 A | 8/2002 |
| WO | 03012622 A1 | 2/2003 |

* cited by examiner

Printer State

| Enable | Printer | Status | Tray | | | |
|---|---|---|---|---|---|---|
| | | | Paper Size | Media Type | Paper Levels | Ink Levels |
| Yes | EPSON PM830C | Printing | A3 | Photo Quality Ink Jet Paper | 50% | 70% |
| Yes | EPSON PM3300C#1 | Ready | Letter | Photo Paper | 30% | 50% |
| | | | Legal | Photo Paper | 40% | |
| Yes | EPSON PM3300C#2 | Ready | Legal | Photo Paper | 30% | 50% |
| | | | Letter | Photo Quality Glossy Paper | NoPaper | |

200

[Close] [Refresh]

FIG.14

Paper State — 210

| Printer | Paper Size | Media Type | Printing# (Normal) | Printing# for Logging | Reprinting# on Error | Printing# for Adjustment | Total Printing# |
|---|---|---|---|---|---|---|---|
| EPSON PM830C | A4 | Plain Paper | 0 | 10 | 0 | 0 | 10 |
| | A3 | Photo Paper | 100 | 0 | 2 | 0 | 102 |
| EPSON PM3300C#1 | A4 | Plain Paper | 0 | 50 | 0 | 0 | 50 |
| EPSON PM3300C#2 | A4 | Plain Paper | 0 | 10 | 0 | 0 | 10 |
| | A3 | Photo Paper | 100 | 0 | 2 | 0 | 102 |

Close    Refresh

FIG.15

User Settings

Adding/Deleting/Modifying Users — 220

| User(Operator) | Password | Change Printer State | Server Settings | Printer Adjustment | Add Error Log | Change Paper | Control Job | Make Template | Print | Settings |
|---|---|---|---|---|---|---|---|---|---|---|
| Administrator | | Permit | Permit | Permit | Permit | Permit | Permit | Permit | Permit | Apply |
| naga | **** | Deny ▽ | Deny ▽ | Deny ▽ | Permit ▽ | Permit ▽ | Permit(own) ▽ | Permit ▽ | Permit ▽ | Apply / Delete |
| template | ****** | Deny ▽ | Deny ▽ | Deny ▽ | Deny ▽ | Deny ▽ | Permit(own) ▽ | Deny ▽ | Permit ▽ | Apply / Delete |
| guest | ***** | Deny ▽ | Deny ▽ | Deny ▽ | Deny ▽ | Deny ▽ | Deny ▽ | Deny ▽ | Deny ▽ | Apply / Delete |
| test | | Deny ▽ | Deny ▽ | Deny ▽ | Deny ▽ | Deny ▽ | Permit(own) ▽ | Deny ▽ | Permit ▽ | Apply / Delete |
| NewUser | | | | | | | | | | Append |

Close | Refresh (Permission spans: Change Printer State, Server Settings, Printer Adjustment, Add Error Log, Change Paper, Control Job, Make Template, Print)

FIG.17

User Information
Now dealer id=D0000041
Change Dealer

260

| Select | Server ID | Studio Name | Address | Phone | e-mail |
|--------|-----------|-------------|---------|-------|--------|
| ○ | U0000122 | EEE LAB | 1234 Kilroy Airpori Way | 0263-52-2552 | EEE@epson.co.jp |
| ○ | U0000142 | AAA Photography | 5678 Artesia Blvd Balllows, CA 90706 | 562-867-0522 | AAA@aol.com |
| ○ | U0000143 | BBB Photography | 901 Broadway #D El Cajon CA 92021 | 935-444--184 | BBB@mail.com |
| ○ | U0000146 | CCC Studio | 2345 Aspan St. Ste 501 | 949-581-5060 | CCC@aol.com |
| ○ | U0000147 | DDD Photography | 6789 Utopia Ave., Culver City, CA 90230 | 310-398-9802 | DDD@juno.com |
| ○ | U0000149 | FFF Photography | 10 East High Street, Moorpark, Ca 93021 | 805-553-0444 | FFF photography@aol.com |
| ○ | U0000165 | GGG Photograpgy | 123 Baseline Ave., Solvang, CA 93463 | 805-688-1025 | GGG photography@syv.com |
| ○ | U0000167 | HHH Studio | 456 Lahnan, Houston TX 77018 | 713-694-7303 | HHH studio@aol.com |
| ○ | U0000168 | III Studios | 7890 east mountain st stone mountain ga. 30083 | 770-469-5305 | III photog@mindspring.com |
| ○ | U0000169 | JJJ Studio | 123 W. 72nd St., New York, NY 10023 | 212-873-5588 | JJJ@photographar.net |
| ○ | U0000171 | LLL Lab | 4567 Kilroy Airport Way | 562-981-3840 | LLL@ea.epson.com |

◉ Change ○ Delete

PRINTING SYSTEM AND PRINTING METHOD

FIELD OF ART

The present invention relates generally to a printing system employing computer(s) and electronic printer(s), and pertains more particularly to a printing system suited to operations, from the taking of photograph(s) to the printing thereof, taking place at photo studio(s).

TECHNICAL BACKGROUND

As a result of improvements in digital camera and electronic printer performance, not only amateurs but also photographic industry professionals have begun using digital cameras and electronic printers. Amateurs as well as professionals typically make use of a simple system wherein an electronic printer is connected by way of a dedicated interface cable, LAN, or the like to a personal computer on which a photo retouching program is installed. Use of a sophisticated photo retouching program makes it possible to carry out a diverse variety of retouching and/or color correction operations on photographic images taken with a digital camera, and/or freely vary the size and/or resolution of such images. Inkjet printers are favorably used as such electronic printers, as they permit printed output of high-quality full-color photographs that are as good as silver halide photographs.

The typical system described above performs extremely well in terms of its ability to permit each individual photograph to be finished as necessary to achieve a quality print which can then be output. However, at photo studios or other such sites dealing with commercial or professional photographic prints, a variety of other capabilities are required in addition to capabilities related to high-quality print generation.

First and foremost, professionals demand the ability to produce printed output having color that is consistent with what they were expecting. One factor which interferes with this ability is the fact that the characteristics affecting color in digital cameras, computer display monitors, printers, and other such image processing devices differ from device to device. For this reason, the color of the original image taken with the camera, the color of the image on the monitor screen, and the color of the image which is printed out will all be different. Despite this, conventional systems do not possess the capability to automatically adjust color to compensate for differences in color characteristics among devices. Unless the user has a good understanding of the color characteristics of each device and manually adjusts color himself or herself in, for example, photo retouching software or the like, the user will be unable to produce printed output having color that is consistent with what the user was expecting.

Second, the ability to efficiently process studio business is demanded. For example, as the operation which takes the most time at a photo studio is the retouching of photographs, there is a demand for reduction in the amount of time that must be set aside for same. Conventional photo retouching software is provided with an extremely diverse variety of retouching functionalities so as to also appeal to graphical designers and the like. However, as the retouching carried out most frequently by photo studios is more or less limited to a few particular categories, it is instead more important that they be able to carry those particular categories of retouching quickly and in routine fashion. Furthermore, as there are any number of standard sizes which may be used for printed output of commercial photographs, prior to printing it is necessary to carry out print layout operations wherein photograph size is made to conform to such a standard size and/or multiple numbers of photographs of standard size are arranged on a sheet of media. However, such print layout operations also represent an inconvenience in conventional systems. There is therefore a demand that such print layout operations be made capable of being carried out easily and in routine fashion. There is furthermore a desire to be able to carry out photo retouching operations simultaneously and in parallel fashion with respect to printing of photos which have already been retouched.

Third, the ability to manage studio business is demanded. For example, capabilities such as would permit proper management of printer status, execution history, and execution status of a multiplicity of print jobs are demanded. There is demand and desire that such management should allow prevention of interruption to printing operations caused by printer failures or the like, allow supply of consumables to take place as appropriate, allow system maintenance to take place as appropriate, and/or improve efficiency of operations for calculation of charges.

DISCLOSURE OF INVENTION

It is an object of the present invention to provide a printing system suitable for photo studio use, and in particular, to provide a system which makes it possible to easily obtain printout(s) close in color to that which is desired by user(s).

It is another object of the present invention to provide a printing system which is suitable for photo studio use and which permits photo retouching operations and print layout/design editing operations to be carried out efficiently.

A printing system in accordance with one aspect of the present invention is equipped with one or more photo editing means for causing one or more desired editing operations to be carried out on image data, at least one of the photo editing means being capable of causing one or more working color profiles indicating one or more working color spaces for at least one of the editing operation or operations to be automatically set for at least a portion of the image data subject to editing, and capable of causing, after completion of at least one of the editing operation or operations, at least a portion of the edited image data to be output in linked fashion with at least one of the working color profiles or profiles; one or more printers; and one or more print control means for causing print image data to be created using at least a portion of the edited image data and permitting at least one of the printer or printers to be driven using at least a portion of the created print image data, at least one of the print control means having one or more printer color profiles indicating one or more color spaces for at least one of the printer or printers, and color matching being carried out on at least a portion of the edited image data using at least one of the working color profiles or profiles linked to at least a portion of the edited image data and at least one of the printer color profile or profiles when at least one of the print image or images is created.

A preferred embodiment of the system is further equipped with one or more display monitors; and one or more display control means for causing at least a portion of the image data subject to editing to be output to at least one of the display monitor or monitors while at least one of the editing operation or operations is being carried out, at least one of the display control means having one or more monitor color profiles indicating one or more monitor color spaces for at least one of the display monitor or monitors, and color matching being carried out on at least a portion of the image data subject to editing using at least one of the working color profiles or profiles and at least one of the monitor color profile or profiles when at least a portion of the image data subject to editing is output to at least one of the display monitor or monitors.

In a preferred embodiment, at least one of the photo editing means identifies one or more original color profiles that it detects as having been or assumes to have been previously linked to at least a portion of the image data subject to editing, and selects one of (1) through (3), below—

(1) at least one of the detected or assumed original color profile or profiles, (2) one or more color profiles substantially corresponding to one or more color profiles for one or more display monitors, (3) one or more user-specified color profiles—which it sets as at least one of the working color profiles or profiles. At such time, unless otherwise requested by a user, (1) or (2), above, may be automatically selected as the default setting.

In a preferred embodiment, at least one of the photo editing means, in the event that at least one of the original color profile or profiles is different from at least one of the working color profile or profiles, carries out color matching on at least a portion of the image data subject to editing using at least one of the original color profile or profiles and at least one of the working color profiles or profiles before beginning at least one of the editing operation or operations.

In a preferred embodiment, unless otherwise requested by a user, one of (1) or (2), above, is automatically selected as the default setting by at least one of the photo editing means.

In a preferred embodiment, when at least one of the original color profile or profiles cannot be detected, one of (1) or (2), below—

(1) one or more color profiles substantially corresponding to one or more color profiles of at least one of the display monitor or monitors, (2) one or more user-specified color profiles—is selected by at least one of the photo editing means and is assumed to be at least one of the original color profiles or profiles.

In a preferred embodiment, at least one of the photo editing means is equipped with (1) one or more image retouching means for causing one or more desired retouching operations to be carried out on at least a portion of the image data subject to editing, at least one of the image retouching means being capable of causing one or more working color profiles for at least one of the retouching operation or operations to be automatically set for at least a portion of the image data subject to retouching, and capable of causing, after completion of at least one of the retouching operation or operations, at least a portion of the retouched image data to be output in linked fashion with at least one of the working color profiles or profiles for at least one of the retouching operation or operations; and (2) one or more layout editing means for causing one or more desired print layout editing operations to be carried out for at least a portion of the image data subject to editing, at least one of the layout editing means being capable of causing one or more working color profiles for at least one of the print layout editing operation or operations to be automatically set for at least a portion of the image data subject to print layout editing, and capable of causing, after completion of at least one of the print layout editing operation or operations, at least a portion of the print-layout-edited image data to be output in linked fashion with at least one of the working color profiles or profiles.

In a preferred embodiment, at least one of the image retouching means identifies one or more original color profiles that it detects as having been or assumes to have been previously linked to at least a portion of the image data subject to photo retouching, and selects one of (1) through (3), below—

(1) at least one of the detected or assumed original color profile or profiles, (2) one or more color profiles substantially corresponding to one or more color profiles for one or more display monitors, (3) one or more user-specified color profiles—which it sets as at least one of the working color profiles or profiles for at least one of the photo retouching operation or operations.

In a preferred embodiment, at least one of the print layout editing means identifies one or more original color profiles that it detects as having been or assumes to have been previously linked to at least a portion of the image data subject to print layout editing, and sets at least one of the detected and/or assumed original color profile or profiles as at least one of the working color profiles or profiles for at least one of the print layout editing operation or operations.

A preferred embodiment is further equipped with one or more means for updating at least one of the printer color profile or profiles in correspondence to changes occurring in at least one of the printer or printers over time.

A printing method in accordance with another aspect of the present invention comprises one or more steps wherein one or more desired editing operations is or are carried out on image data; one or more steps wherein one or more working color profiles indicating one or more working color spaces for at least one of the editing operation or operations is or are automatically set for at least a portion of the image data subject to editing; one or more steps wherein, after completion of at least one of the editing operation or operations, at least a portion of the edited image data is output in linked fashion with at least one of the working color profiles or profiles; one or more steps wherein print image data is created using at least a portion of the edited image data, at which time color matching is carried out on at least a portion of the edited image data using at least one of the working color profiles or profiles linked to at least a portion of the edited image data and one or more printer color profiles indicating one or more color spaces for at least one of the printer or printers; and one or more steps wherein one or more printers is or are driven using one or more created print images.

An image editing apparatus in accordance with yet another aspect of the present invention is equipped with one or more means for carrying out one or more desired editing operations on image data; one or more means for causing one or more working color profiles indicating one or more working color spaces for at least one of the editing operation or operations to be automatically set for at least a portion of the image data subject to editing; and one or more means for causing, after completion of at least one of the editing operation or operations, at least a portion of the edited image data to be output in linked fashion with at least one of the working color profiles or profiles. A computer program in accordance with yet another aspect of the present invention is capable of causing one or more computers to carry out one or more steps wherein one or more desired editing operations is or are carried out on image data; one or more steps wherein one or more working color profiles indicating one or more working color spaces for at least one of the editing operation or operations is or are automatically set for at least a portion of the image data subject to editing; and one or more steps wherein, after completion of at least one of the editing operation or operations, at least a portion of the edited image data is output in linked fashion with at least one of the working color profiles or profiles.

A printer control apparatus in accordance with yet another aspect of the present invention is equipped with one or more image data acquisition means for acquiring image data and one or more color profiles for one or more devices at which at least a portion of this image data was created and/or edited; one or more means for storing one or more color profiles for one or more printers; one or more print image data creating means for creating print image data using image data, at least one of the print image data creating means being capable, when creating at least a portion of the print image data, of carrying out color matching on at least a portion of the image data using at least one of the printer color profile or profiles and at least one of the device color profile or profiles; and one or more printer drive means for driving one or more printers using at least a portion of the print image data.

A preferred embodiment of this printer control apparatus is further equipped with capability for updating one or more stored color profiles. For example, one or more color profiles may be updated in correspondence to changes in printer characteristics over time. A printer control method in accordance with yet another aspect of the present invention comprises one or more steps wherein image data and one or more color profiles for one or more devices at which at least a portion of this image data was created and/or edited are acquired; one or more steps wherein one or more color profiles for one or more printers is or are acquired; one or more steps wherein print image data is created using at least a portion of the image data, at which time color matching is carried out on at least a portion of the image data using at least one of the printer color profile or profiles and at least one of the device color profile or profiles; and one or more steps wherein one or more printers is or are driven using at least a portion of the print image data.

A computer program in accordance with yet another aspect of the present invention is capable of causing one or more computers to carry out one or more steps wherein image data and one or more color profiles for one or more devices at which at least a portion of this image data was created and/or edited are acquired; one or more steps wherein one or more color profiles for one or more printers is or are acquired; one or more steps wherein print image data is created using at least a portion of the image data, at which time color matching is carried out on at least a portion of the image data using at least one of the printer color profile or profiles and at least one of the device color profile or profiles; and one or more steps wherein one or more printers is or are driven using at least a portion of the print image data.

A printing system in accordance with yet another aspect of the present invention is equipped with one or more client systems capable of generating print job data and one or more printers capable of executing one or more print jobs received from at least one of the client system or systems, at least one of the client system or systems having storage capable of storing image data; one or more image retouching programs capable of causing image data to be read as desired from at least a portion of the storage, capable of causing one or more desired retouching operations to be carried out on at least a portion of the read image data, and capable of causing at least a portion of the retouched image data to be stored in at least a portion of the storage; and one or more layout editing programs which is or are computer program or programs independent of at least one of the image retouching program or programs and which is or are capable of causing one or more desired sets of image data to be read from at least a portion of the storage, capable of causing one or more print layout editing operations to be carried out for at least a portion of the read image data, and capable of causing print job data to be created using one or more edited print layout or layouts.

In a preferred embodiment, at least one of the client system or systems is equipped with a plurality of client machines connected so as to permit mutual communication such that at least a portion of the storage is shared, at least one of the image retouching program or programs and at least one of the layout editing program or programs being capable of being executed in parallel on respectively different client machines.

In a preferred embodiment, at least one of the image retouching program or programs has one or more browsing means for browsing one or more sets of image data present within at least a portion of the storage and selecting desired image data; one or more trimming means for carrying out trimming as desired on one or more images selected using at least one of the browsing means; one or more retouching means for carrying out one or more desired modifications at one or more desired locations on image data selected using at least one of the browsing means; one or more color adjusting means for adjusting color or colors as desired on image data selected using at least one of the browsing means; and one or more guiding means for guiding one or more users to sequentially use at least one of the trimming means, at least one of the retouching means, and at least one of the color adjusting means in at least one prescribed order.

In a preferred embodiment, at least one of the client system or systems has one or more photo retouching programs which is or are separate from at least one of the image retouching program or programs; and at least one of the image retouching program or programs has one or more means for launching at least one of the photo retouching program or programs responsive to user request while at least one of the retouching operation or operations is underway, passing at least a portion of image data which is the subject of at least one of the retouching operation or operations to at least one of the photo retouching program or programs, and temporarily halting at least one of the retouching operation or operations; and one or more means for, upon termination of at least one of the photo retouching program or programs, receiving at least a portion of image data which is the subject of at least one of the retouching operation or operations from at least one of the photo retouching program or programs and causing resumption of at least one of the retouching operation or operations.

In a preferred embodiment, at least one of the layout editing program or programs has one or more means for displaying one or more thumbnail image lists for one or more sets of image data present within at least a portion of the storage; one or more means for displaying one or more templates representing one or more basic print layouts wherein one or more photo frames of one or more desired sizes is or are arranged on one or more print pages of one or more desired sizes; one or more means for causing, responsive to one or more user operations whereby desired image data is selected from at least one of the list or lists and whereby at least one desired photo frame within at least one of the template or templates is selected, one or more images representing at least a portion of the desired image data to be displayed within at least one of the desired photo frame or frames within at least one of the template or templates, and one or more print layouts to be edited as displayed at at least one of the template or templates; and one or more means for causing, after completion of at least one of the print layout editing operations, print job data to be created in accordance with at least one of the edited print layout or layouts.

A preferred embodiment is further equipped with one or more template libraries storing a plurality of templates respectively representing a plurality of basic print layouts; at least one of the layout editing program or programs being capable of causing one or more desired templates to be acquired from at least one of the template library or libraries.

A method in accordance with another aspect of the present invention, whereby print job data is created by one or more client systems having at least one image retouching program and at least one layout editing program which are mutually independent, comprises one or more steps wherein image data is acquired from one or more external devices and at least a portion of the acquired image data is stored in storage; one or more steps wherein at least one of the image retouching program or programs is used to carry out one or more retouching operations on desired image data present within at least a portion of the storage, and at least a portion of the retouched image data is stored in at least a portion of the storage; and one or more steps wherein at least one of the layout editing program or programs is used to carry out one or more print layout editing operations on one or more desired sets of image data present within at least a portion of the storage, and at least a portion of the edited print layout or layouts is used to create print job data.

In a preferred embodiment, at least one of the client system or systems is equipped with a plurality of client machines connected so as to permit mutual communication such that at least a portion of the storage is shared. Moreover, at least one of the step or steps wherein at least one of the image retouching program or programs is used may be carried out on at least one among the plurality of client machines, and furthermore, at least one of the step or steps wherein at least one of the layout editing program or programs is used may be carried out on at least one other thereamong.

BRIEF DESCRIPTION OF DRAWINGS

FIG. 11 is a drawing showing an example of a job list page 180 which might be provided to WWW browser 17 from print server machine 2.

FIG. 13 is a drawing showing an example of a printer status page 200 which might be provided to WWW browser 17 from print server machine 2.

FIG. 14 is a drawing showing an example of a paper status page 210 which might be provided to WWW browser 17 from print server machine 2.

FIG. 15 is a drawing showing an example of a user information page 220 which might be provided to WWW browser 17 from print server machine 2.

FIG. 17 is a drawing showing an example of a web page for display of list(s) of photo studio(s) whose account(s) is or are handled by respective dealer(s) such as might be provided by WWW server 82 of center server machine 8.

FIG. 18 is a drawing showing an example of a web page for display of upload history or histories at photo studio(s) whose account(s) is or are handled by a given dealer or dealers such as might be provided by WWW server 82 of center server machine 8.

BEST MODE FOR CARRYING OUT INVENTION

Before beginning description of embodiments, "color profiles" and "color matching," repeated reference to which is made throughout such description, will be described.

Each of the various image processing devices (e.g., cameras, image scanners, display monitors, printers, etc.) has its own unique color space(s) in which operations are carried out and its own unique gamut(s) (gamut), i.e., locus or loci of colors that can be created. For example, while display monitors all operate within RGB color space, gamut will vary from monitor to monitor. Likewise, gamuts of printers, which carry out operations in CMYK color space, will be different for different printers. Furthermore, even the same printer will exhibit different gamuts depending upon the type of ink and printing medium (printing paper) used therewith.

Figure 1:
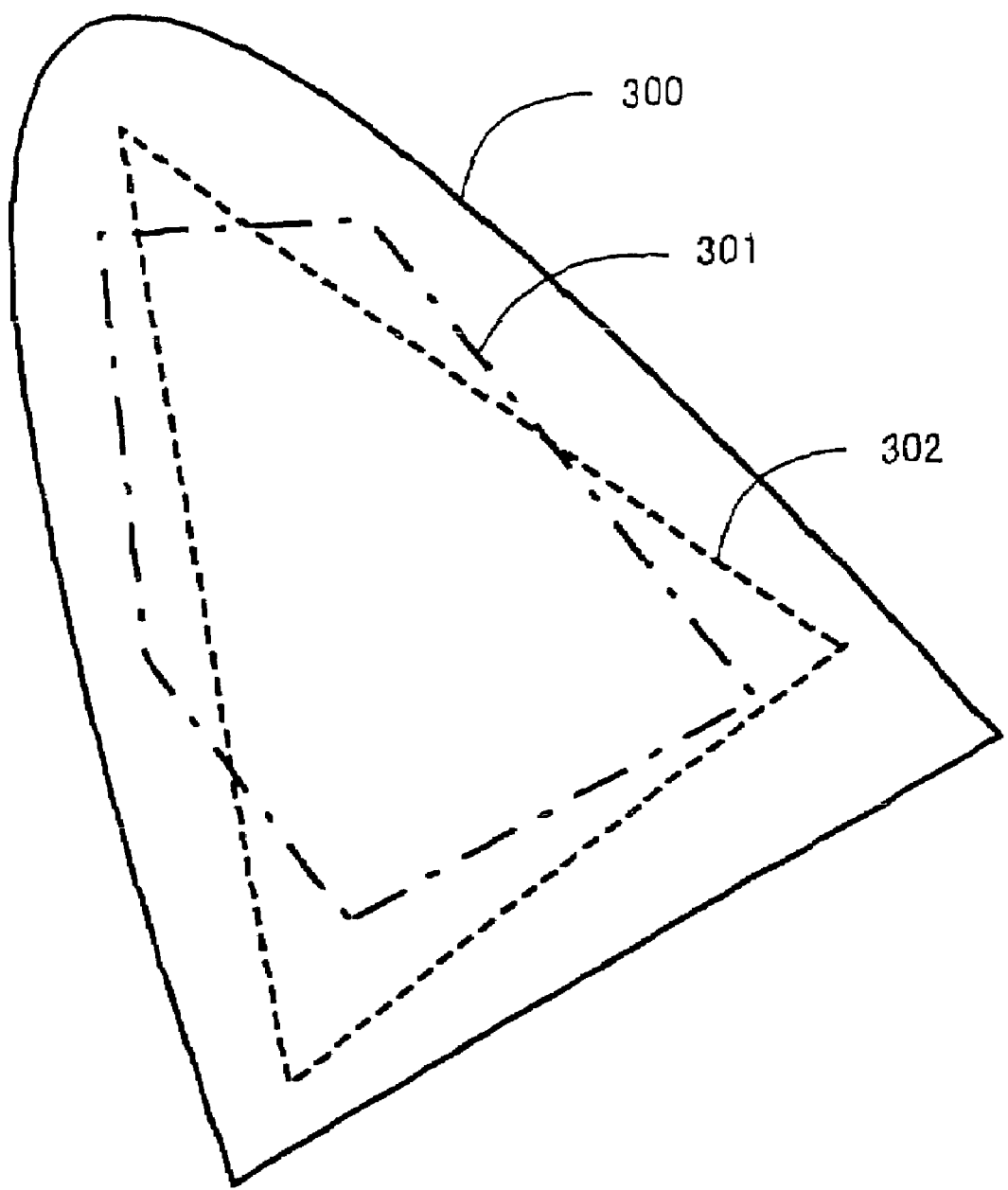
FIG. 1 is drawing showing a schematic example of printer and monitor gamuts.

FIG. 1 is drawing showing a schematic example of gamuts of different devices. At FIG. 1, reference numeral 300 indicates gamut visibly perceivable by human beings, reference numeral 301 indicates gamut capable of being printed out by a particular printer, and reference numeral 302 indicates gamut capable of being displayed by a particular display monitor. As shown in FIG. 1, gamut varies depending on device.

An output device such as a monitor or printer is only capable of expressing colors within the range of its gamut. An input device such as a camera or image scanner is only capable of storing colors within the range of its gamut. The fact that gamut varies from device to device in this fashion means that the color space within which the device operates will vary from device to device. For example, while every printer operates within the same type of color space, i.e., CMYK, gamut will be different for each individual printer and for each ink and printing medium used therewith. There therefore exist different CMYK color spaces for each individual printer and for each ink and printing medium used therewith.

"Color profiles" refer to numerical representations used to provide rigorous definition of the color spaces within which various devices operate. A color profile includes indication of the type(s) of color space peculiar to that device (e.g., RGB, CMYK, LCH, etc.). But the primary information included as part of a color profile is conversion table(s) for conversion of color space(s) peculiar to that device (e.g., RGB, CMYK, LCH, and/or other such color spaces) to device-independent color space(s) (e.g., XYZ, Yxy, Lab, Luv, and/or other such color spaces), and/or for carrying out conversion in the reverse direction. Such conversion tables make it possible for characteristic gamuts of devices to be quantitatively defined.

The International Color Profile format (International Color Profile format) established by the ICC (International Color Consortium) is a known standard for color profile format. In the description that follows, "ICC profile" refers to a color profile written in this International Color Profile format.

"Color matching," also called "color mapping," refers to the adjustment (shift) which must be made to color values in image data subject to conversion when converting image data in one particular color space to image data in a different color space so as to cause colors in the two color spaces to approximate one another. It is impossible to cause colors to match perfectly when going between two different color spaces if the gamuts thereof are different. But if, when converting image data of one color space to image data of a different color space, great care is exercised in shifting color values of such image data so as to compensate for the difference in gamuts between the two color spaces, it is possible to satisfactorily approximate colors in going from one of the two devices to the other. Processing for shifting color values in this way is called color matching (or color mapping).

Color matching may be carried out through use of color profiles, e.g., ICC profiles, respectively representing source (conversion input) color space(s) and target (conversion output) color space(s). For example, when converting RGB image data output from a digital camera to CMYK image data to be printed by a printer, color matching may be carried out through use of a color profile for the RGB color space of the digital camera as source, and a color profile for the CMYK color space of the printer as target. This will allow a printout to be obtained which has color(s) satisfactorily approximating color(s) as present in pictures taken with the digital camera. Alternatively, when converting RGB image data displayed on a monitor to CMYK image data to be printed by a printer, color matching may be carried out through use of a color profile for the RGB color space of the monitor as source, and a color profile for the CMYK color space of the printer as target. This will allow a printout to be obtained which has color(s) satisfactorily approximating color(s) as displayed on the monitor.

Color matching may be broadly categorized as falling into one of two categories depending upon the method used to handle colors present in the gamut of the source which lie outside of the bounds of the target gamut. In the first method, source colors lying outside of the target gamut are essentially discarded. In the second method, source colors lying outside of the target gamut are shifted so as to make them fall within the target gamut through use of interpolation processing or the like. These two methods each have advantages and disadvantages. Especially with conversion of photographic images, there is less tendency that a person looking at the post-conversion photographic image will be struck by a sense of unnaturalness if the latter color matching method is used. This latter color matching method is referred to as "perceptual color matching."

Figure 2:
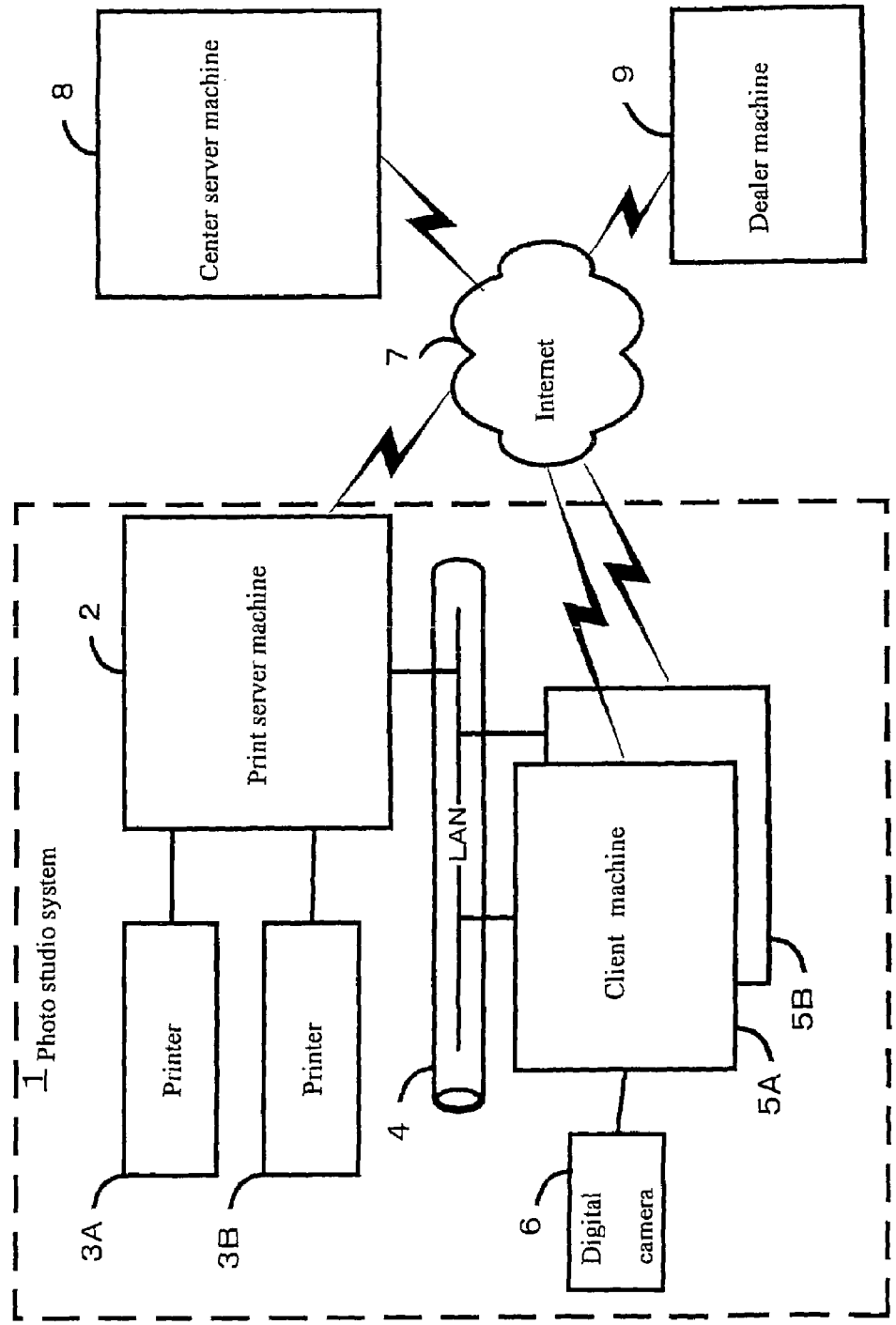
FIG. 2 is a block diagram showing the overall constitution of an embodiment of the present invention.

An embodiment of the present invention is described below. FIG. 2 shows the overall constitution of this embodiment.

At FIG. 2, each of a number of photo studios is equipped with photo studio system(s) 1. Present at photo studio(s) there is or are LAN(s) 4, such LAN(s) 4 connecting print server machine(s) 2 and one or a plurality of (e.g., two) computer machines (hereinafter "client machines") 5A, 5B. Client machines 5A, 5B may connect, e.g., via USB, to digital camera(s) 6. Furthermore, one or a plurality of (here, two) electronic printers 3A, 3B is or are respectively connected, e.g., via USB, to print server machine(s) 2. Each printer 3A, 3B is an inkjet printer employing for example pigment-type inks, these being capable of producing high-quality printed output that is extremely lightfast. Print server machine(s) 2 and the two printers 3A, 3B may be housed within a single dedicated box-like casing (not shown), permitting installation at a single location somewhere at the photo studio.

Client machines 5A, 5B are primarily used to read one or a plurality of photo images from digital camera(s) 6 and store same in disk storage and for editing one or more desired photo images and creating therefrom data representing print job(s) of desired number(s) of pages and other such operations. Included among the types of editing of photo images which may be carried out here are photo retouching operations wherein desired enhancements such as trimming, local modifications, global color adjustment, and/or the like are carried out on individual photo images, print layout editing wherein one or more desired photo images is or are arranged in a desired layout/design so as to occupy the space on a sheet of print media (print page) for creation of print job data, and so forth. Print server machine(s) 2, on the other hand, possesses or possess the ability to accept print job data from client machines 5A, 5B and to create respective page(s) of printed image(s) based thereon and send same to printers 3A, 3B. Furthermore, print server machine(s) 2 possesses or possess the ability to manage status, print job execution status and execution history, and other such information (hereinafter "print information") pertaining to printers 3A, 3B, and to communicate same to client machines 5A, 5B.

Moreover, existing separate from the photo studio(s) there is or are center server machine(s) 8, whose role it is to centrally manage operational status of photo studio systems 1 at a multiplicity of photo studios. Print server machines 2 and client machines 5A, 5B at respective photo studio systems 1 may respectively communicate with center server machine(s) 8 via the Internet 7. Center server machine(s) 8 gather print information for respective photo studios from print server machines 2 of the photo studio systems 1 thereof, this being stored in database(s) of center server machine(s) 8, where it is managed. Upon being logged onto by way of WWW browser(s) by user(s) at respective photo studios, center server machine(s) 8 may provide such a WWW browser with print information for that photo studio as stored in database(s) of center server machine(s) 8. Furthermore, when information indicating occurrence of prescribed event(s) previously specified by user(s) at respective photo studios (e.g., a printer paper jam or other such error) is received from such a photo studio, center server machine(s) 8 may send electronic mail message(s) informing such user(s) of such fact to email address(es) previously specified by such user(s) (e.g. an email address for a mobile phone belonging to such a user). In addition, center server machine(s) 8 may, based on print information from respective photo studios, calculate consumed quantity or quantities of paper, ink, and/or other such consumables at such a photo studio and may make arrangements for supply of consumables to respective photo studios, carry out billing for amounts in connection therewith, and so forth.

Furthermore, in one mode of photo studio business management, intermediate management organization(s) (hereinafter "dealer(s)") might be interposed between center(s) and the several photo studios, each dealer managing business from a plurality of photo studios. In such a case, each dealer would also have computer machine(s) (hereinafter "dealer machine(s)") 9 whereon WWW browser(s) and/or the like is or are installed. Moreover, upon being logged onto by way of WWW browser(s) by respective dealers, center server machine(s) 8 may provide such a WWW browser with print information for photo studio(s) whose account(s) is or are handled by such a dealer. Dealer machine(s) 9 may take the place of center server machine(s) 8 in making arrangements for supply of consumables to respective photo studios, billing for amounts in connection therewith, and so forth based on print information for respective photo studios.

Figure 3:
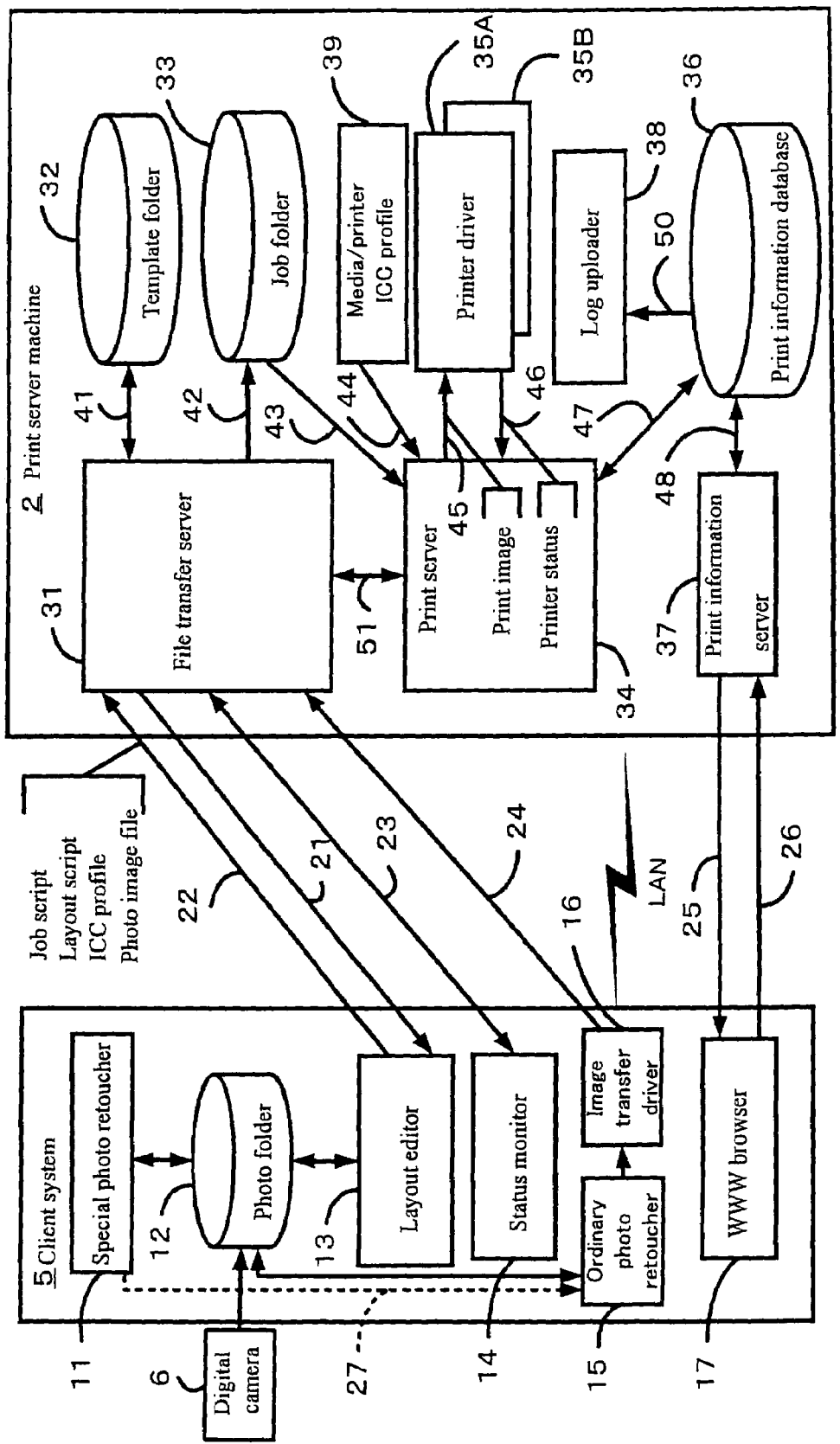
FIG. 3 is a block diagram showing constitution, function, and operation at print server machine 2 and client machines 5A, 5B in photo studio system 1.
Figure 4:
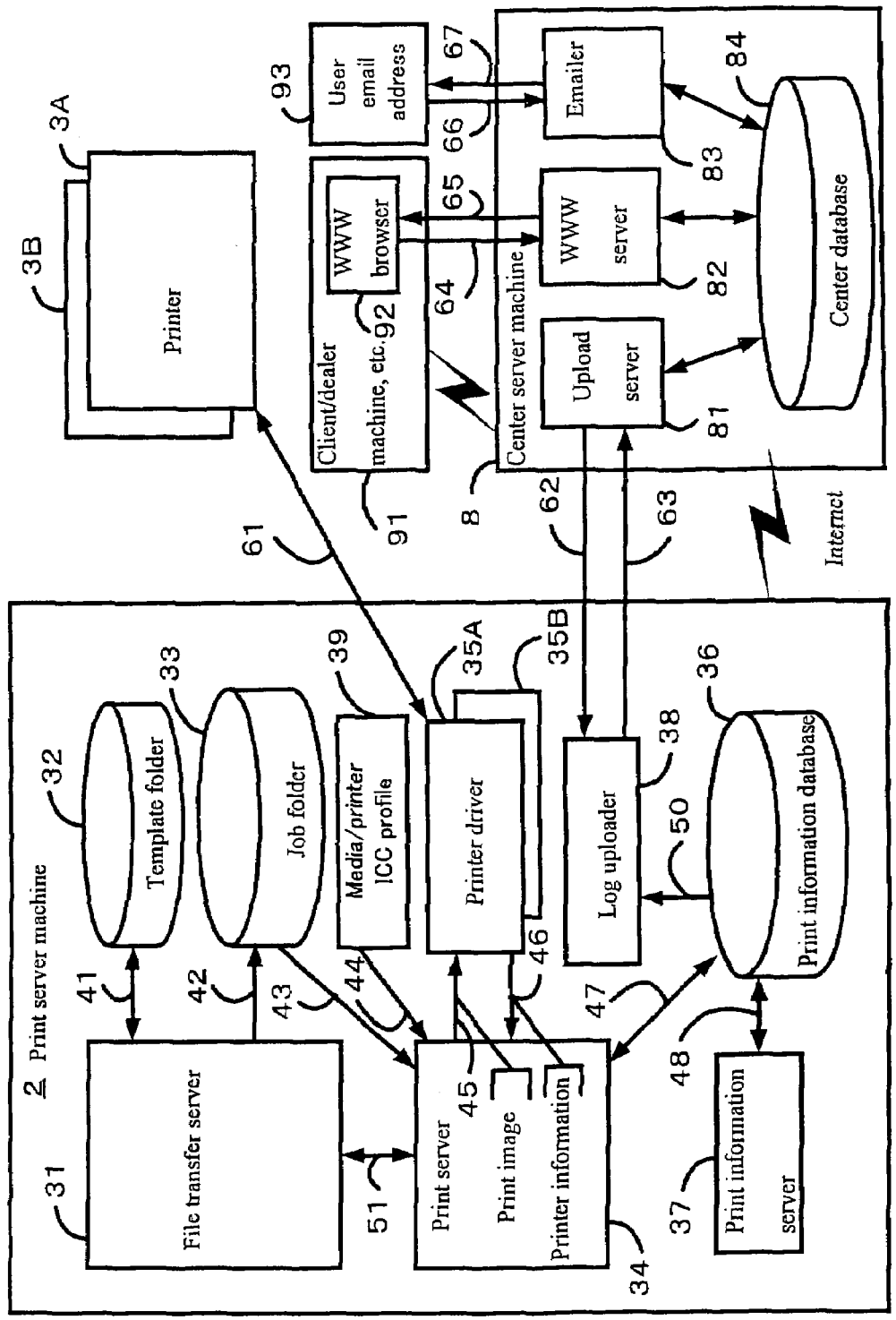
FIG. 4 is a block diagram showing constitution, function, and operation at print server machine 2 and center server machine 8.

Below, constitution and function of the various machines mentioned above will be described in further detail with reference to FIG. 3 and FIG. 4. FIG. 3 shows constitution and function at print server machine 2 and client machines 5A, 5B in photo studio system 1. FIG. 4 shows constitution and function at print server machine 2 and center server machine 8. By looking at FIG. 3 and FIG. 4 together, the relationship among the various machines with respect to exchange of information therebetween will become clear.

Referring first to FIG. 3, constitution and function of client machines 5A, 5B will be described. Note that at FIG. 3, client machines 5A, 5B are indicated collectively by the single block of client system 5. The number of client machines contained at client system 5 need not be two as in the present embodiment, it being possible to employ any number so long as there is one or more thereof. Furthermore, the plurality of application programs 11 through 17 such as will be described below which client system 5 possesses may be installed on all of the client machines comprised by client system 5 or may be installed on any one machine only, or may be installed in distributed fashion such that one program is for example installed on client machine 5A, another program is for example installed on client machine 5B, and so forth.

As shown in FIG. 3, a plurality of application programs, including special photo retoucher 11, layout editor 13, status monitor 14, ordinary photo retoucher 15, image transfer driver 16, and WWW (World Wide Web) browser 17, are installed at client system 5. Moreover, a program for sending and receiving electronic mail (not shown) may also be installed at client system 5.

Special photo retoucher 11, being a specially designed photo retouching program for photo studio use, is constituted so as to permit prescribed retouching tasks typically required at photo studios to be carried out efficiently and in routine fashion.

When beginning retouching operations on respective photo image(s), this special photo retoucher 11 automatically (always, unless otherwise requested by the user) causes ICC color profile(s) to be set which indicates or indicate color space(s) in which those retouching operations are to be carried out. The user may specify the type of color space(s) for which ICC color profile(s) is or are to be set. But where there is no specific specification from user(s), special photo retoucher 111 will, in accordance with default settings, always cause ICC color profile(s) to be set for all respective photo image(s) subject to retouching. Furthermore, when outputting photo image(s) after retouching thereof is finished, special photo retoucher 11 embeds such ICC profile(s) in file(s) containing such photo image(s).

Note that color space(s) in which photo image editing operations are carried out prior to printing, such as color space(s) in which this special photo retoucher 11 carries' out retouching operations or color space(s) in which layout editor 13, described next, carries out print layout editing operations, will hereinafter be referred to as "working color space(s)" for such photo images. Note also that ICC profile(s) indicating such working color space(s) will hereinafter be referred to as "working ICC profile(s)."

Layout editor 13, being an application program for print layout/design editing intended for photo studios, is designed to permit print layout editing operations, wherein one or more photo images is or are arranged so as to occupy print page(s) (the space(s) on sheet(s) of print media) with size(s) of respective photo image(s) being made to conform to desired standard size(s), to be carried out quickly and in routine fashion. That is, as indicated by arrow 21, layout editor 13 reads from print server machine 2 a multiplicity of templates respectively representing various basic print layouts/designs previously prepared and made available at print server machine 2, and displays template(s) desired by user(s) at monitor(s) of client system 5. The basic print layouts/designs represented by the respective templates are space(s) (print page(s)) of standard print media size(s) capable of being used by printer(s), e.g., A4, A3, or B4, etc., in landscape (horizontal) or portrait (vertical) orientation, wherein one or a plurality of photo frame(s) of standard photo size(s), e.g., 8×10 inch, 5×7 inch, 2.5×3.5 inch, or 1.75×2.5 inch, is or are arranged. Many templates are such that photo frame(s) is or are efficiently arranged so as to make sufficiently small the total area outside of photo frame(s) in order to make economic use of print media. By using pointing device(s) such as a mouse at graphical user interface(s) of layout editor 13 to drag and drop desired photo image(s) onto desired respective photo frame(s) within template(s), user(s) can cause print page layout/design editing to be carried out automatically.

When beginning print layout editing operations on respective photo image(s), layout editor 13 also causes working ICC profile(s) for working color space(s) in which such operations are to be carried out to be set for such photo image(s). If particular ICC profile(s) has or have previously been embedded in such photo image(s), layout editor 13 uses such embedded ICC profile(s) as working ICC profile(s). Because image(s) which has or have, for example, been subjected to retouching by special photo retoucher 11 will already have embedded therein ICC profile(s) for color space(s) in which special photo retoucher 11 operated, this means that layout editor 13 will operate in exactly the same color space(s) as the color space(s) in which special photo retoucher 11 operated. If, on the other hand, such photo image(s) does or do not yet have ICC profile(s) embedded therein, layout editor 13 automatically guesses at ICC profile(s) which it assumes to have been previously embedded in such photo image(s), using such assumed ICC profile(s) as working ICC profile(s). User(s) may specify exactly what ICC profile(s) is or are to be assumed in such a case. But where there is no specific specification from user(s), layout editor 13 will automatically use specific ICC profile(s) which has or have been set by default as the ICC profile(s) which it assumes and uses as if previously embedded in such photo image(s). Furthermore, when outputting photo image(s) after print layout editing is finished, layout editor 13 embeds working ICC profile(s) automatically set as described above in file(s) containing such photo image(s).

Upon completion of editing of the layout of all print pages constituting a single print job, layout editor 13 creates data for that print job, which is transferred to print server machine 2 as indicated by arrow 22. Such print job data includes data indicating layout of all print page(s) contained within that print job, file(s) containing all photo image(s) to be placed on such print page(s), and working ICC profile(s) embedded in such photo image file(s).

Layout editor 13 is made available as an independent program separate from retouching program(s) such as the special photo retoucher 11, described above, or the ordinary photo retoucher 15, described below. Moreover, client machines 5A, 5B, whereon such programs are installed, are connected by way of LAN 4, presence of prescribed shared storage area(s) (e.g., shared photo folder(s) 12) permitting transfer and/or sharing of photo image files and/or various other such data and/or various programs and/or other such resources(s) therebetween or thereamong by way of such shared storage area(s). This makes it possible for studio business to proceed efficiently and in such manner as to permit one user at a studio to for example use one client machine 5A to carry out photo retouching operations with retouching program 11 or 15 on photo image(s) acquired from digital camera(s) 6, photo image(s) being stored in shared photo folder(s) 12 at client machine(s) 5A and/or 5B after completion of retouching thereof. In parallel fashion with respect thereto, another user might use the other client machine 5B, utilizing layout editor 13 to read, from shared photo folder(s) 12, photo image(s) which has or have already been retouched and to carry out print layout editing operations on such retouched photo image(s). In this way, in accordance with a method whereby photo retouching and print layout editing are executed in parallel fashion by different people using different client machines, it is possible for studio business to proceed efficiently. Furthermore, if there are three or more client machines, this will allow studio business to proceed in all the more flexible and efficient fashion.

As indicated by arrow 23, status monitor 13 obtains the most recent history information pertaining to errors generated by printers 3A, 3B and completion of execution (completion of printing) of respective print jobs from print server machine 2 at time intervals (e.g., every 10 minutes, etc.) previously set by user(s), displaying same on display monitor(s) of client system 5.

Ordinary photo retoucher 15, being a conventionally known ordinary photo retouching program, is provided not only with retouching functionalities typically required at photo studios but also with a diverse variety of retouching functionalities capable of satisfying graphical designers and the like. With respect to tasks within the bounds of retouching typically performed at photo studios, special photo retoucher 11, described above, is designed to allow operations to proceed more efficiently than would be the case with ordinary photo retoucher 15. But in the event of a desire to perform atypical retouching not supported by special photo retoucher 11, user(s) may use ordinary photo retoucher 15 instead of special photo retoucher 11.

Special photo retoucher 11, described above, is designed to permit retouching operations to be performed in cooperation with ordinary photo retoucher 15. That is, special photo retoucher 11 has button(s) on its graphical user interface for launching ordinary photo retoucher 15. Moreover, if such button(s) is or are pressed by user(s) (e.g., by left-clicking with a mouse) while retouching operations are underway on particular photo image(s), special photo retoucher 11 automatically assigns specific file name(s) to and saves the photo image(s) on which operations were underway, storing such file name(s), and furthermore, as indicated by arrow 27, launches ordinary photo retoucher 15 and informs ordinary photo retoucher 15 of such file name(s), causing such photo image(s) to be opened therein. In addition, special photo retoucher 11 itself becomes inactive. Upon termination of ordinary photo retoucher 15 thereafter, special photo retoucher 11 automatically becomes active again, reopening the photo image file(s) having the file name(s) which was or were stored. As a result, if the photo image(s) passed from special photo retoucher 11 to ordinary photo retoucher 15 as described above is or are stored with the same file name(s) prior to termination of ordinary photo retoucher 15, this means that special photo retoucher 11 will automatically reopen that or those photo image file(s), permitting resumption of continued retouching operations thereon. Combination of special photo retoucher 11 and ordinary photo retoucher 15 in this way makes it possible for retouching operations to proceed efficiently. Moreover, when photo image(s) is or are passed from special photo retoucher 11 to ordinary photo retoucher 15, because there is no guarantee that working ICC profile(s) of such photo image(s) would be preserved by ordinary photo retoucher 15, special photo retoucher 111 discards such working ICC profile(s). Furthermore, when reopening such photo image file(s), special photo retoucher 11 again causes working ICC profile(s) to be set.

Image transfer driver 16, launched at time(s) of print request(s) from ordinary photo retoucher 15, creates print job data for photo image(s) open in ordinary photo retoucher 15 and transfers same to print server machine 2, as indicated by arrow 24.

WWW browser(s) 17 is or are program(s) for accessing various WWW servers available over the Internet 7 or LAN(s) 4. First among the ways in which WWW browser(s) 17 may be used in connection with photo studio business is for connecting to print information server(s) (where such a server is, for example, a type of WWW server) 37 of print server machine 2 and, as indicated by arrows 25 and 26, accessing status, print job execution history, and other such printer information for printers 3A, 3B which is managed by print server machine 2. Second, as indicated by arrow 65 of FIG. 4, is for connecting to WWW server(s) 82 of center server machine(s) 8 and accessing printer information or the like for such photo studio(s) which is managed by center server machine(s) 8.

Next, referring to FIG. 3 and FIG. 4, function and constitution of print server machine 2 will be described.

As shown in FIG. 3 and FIG. 4, programs including file transfer server 31, print server 34, printer drivers 35A, 35B, print information server 37, and log uploader 38, are installed at print server machine 2.

File transfer server 31 possesses a multiplicity of templates representing various basic print layouts/designs and carries out processing for providing such templates to layout editor 13 of client system 5, processing for accepting print job data from image transfer driver 16 and/or layout editor 13 of client system 5 and for transferring same to print server 34, processing for sending to status monitor 14 of client system 5 information concerning the situation with respect to occurrence of errors, termination of execution of print jobs, and so forth at printers 3A, 3B which is provided by print server 34, and so forth.

This file transfer server 31 possesses templates for a variety of basic print layouts/designs previously prepared and made available at template library folder 32 within disk storage at print server machine 2. Furthermore, when specific template(s) is or are requested by layout editor 13 of client system 5, file transfer server 31 reads the requested template(s) from template library folder 32 as indicated by arrow 41, and transfers same to layout editor 13 as indicated by arrow 21. Utilization of such templates facilitates print layout editing at layout editor 13. It is possible to make use of the shared templates which are centrally managed by print server machine 2 no matter which client machine 5A, 5B is or are being used to carry out print layout editing.

Furthermore, file transfer server 31 receives print job data from image transfer driver 16 and/or layout editor 13 of client system 5 as indicated by arrow 22 (and/or 24), and stores such print job data in job folder 33 within disk storage at print server machine 2 as indicated by arrow 42. As shown in the drawing, the print job data from layout editor 13, indicated by arrow 22, comprises job script(s) for such print job(s), layout script(s) for one or more pages included within such print job(s), file(s) containing one or a plurality of photo image(s) included within such print job(s), and working ICC profile(s) for such photo image(s). What is here referred to as a job script is or are file(s) containing description of item(s) necessary for management of such print job(s); e.g., user name(s), printing priority, number of copies to be printed, designation of type(s) (material(s)) and size(s) of print media, designation of printer(s), time stamp(s) for such print job(s), and/or the like. What is here referred to as a layout script is or are file(s) containing description of item(s) necessary for determining print layout(s)/design(s) for such respective print page(s); e.g., identification number(s) for template(s) used, name(s) of file(s) containing photo image(s) to be respectively placed in one or more photo frame(s) within such template(s), settings for print options (e.g., printing of register mark(s), file name(s), etc.), and/or the like. To reduce print job data volume, each photo image file is as a rule sent only once in a single print job data transmission regardless of how many of such photos are to be printed. Working ICC profile(s) embedded in respective photo image file(s), as described above, indicate working color space(s) in which editing operations were carried out on such photo image(s) at client system 5.

Furthermore, upon receipt of request(s) from status monitor 14 of client system 5 for history information, file transfer server 31 communicates same to print server 34 as indicated by arrow 23, and moreover, receives history information pertaining to printer errors and completion of print jobs sent thereto from print server 34 responsive to such request and transfers same to status monitor 14 of client system 5 as indicated by arrow 23.

Print server 34 carries out processing for creating print image data for respective page(s) from print job data, processing for assignment of respective set(s) of print image data to printer(s) 3A and/or 3B and for sending such set(s) of print image data to printer driver(s) 35A and/or 35B for printer(s) to which it or they was or were assigned, processing for managing status and print job execution history of printer(s) 3A and/or 3B as provided by printer driver(s) 35A and/or 35B, and so forth. Printer drivers 35A, 35B—respectively corresponding to printers 3A, 3B—carry out processing for converting print image data received from print server 34 into data of such form as to permit processing thereof by printers 3A, 3B and for sending same to printers 3A, 3B, processing for monitoring status of printers 3A, 3B and communicating same to print server 34, and so forth.

Print server 34 reads print job data for respective print job(s) from job folder 33 as indicated by arrow 43. As previously mentioned, print job data includes job script(s) for such print job(s), layout script(s) for print page(s), photo image file(s), and working ICC profile(s) for photo image(s). Print server 34 uses layout script(s) for respective print page(s) included within such print job data, and uses file(s) containing photo image(s) placed on respective print page(s), to create print image data for respective print page(s) with layout(s)/design(s) as edited by user(s).

In creating print image data for respective print page(s), print server 34 reads such job script(s) and ascertains the printer(s) and print media type(s) to be used for printing such print page(s). (The printer(s) and print media used for printing are hereinafter respectively referred to as "output printer(s)" and "output media.") In addition, as indicated by arrow 44, print server 34 reads, from prescribed folder 39 at print server machine 2, ICC profile(s) (hereinafter "printer ICC profile(s)") indicating color space(s) (hereinafter "printer color space(s)") in which such output printer(s) 3A and/or 3B is or are to carry out printing operations using such output media. Previously saved within such folder 39 are printer ICC profiles characteristic of each type of print media respectively capable of being used with printer 3A and printer 3B. Furthermore, printer ICC profiles for all printers of all photo studios are stored at center server machine 8, print server machine(s) 2 of respective photo studio(s) being capable of downloading printer ICC profile(s) for printer(s) 3A, 3B at such photo studio(s) from center server machine 8 by designating, for center server machine 8, machine number(s) for such printer(s) 3A, 3B (such machine numbers being identification numbers unique to the individual printers).

After reading printer ICC profile(s) corresponding to output printer(s) and output media from folder 39 as described above, print server 34 uses the printer ICC profile(s) which was or were read and working ICC profile(s) for respective photo image(s) on respective print page(s) to carry out perceptual color matching on respective set(s) of photo image data. This permits respective set(s) of photo image data to be adjusted so as to produce color(s) when printed out that is or are as close as possible to the color(s) present during editing thereof. In addition, print server 34 uses such adjusted photo image data to create print image data for respective print page(s). Print server 34 thereafter sends the created print image data for respective print page(s) to printer driver(s) 35A and/or 35B corresponding to output printer(s) as indicated by arrow 45. Printer drivers 35A, 35B respectively convert print image data (e.g., RGB-type bitmapped image data) received from print server 34 into print data of such form as to permit processing thereof by printers 3A, 3B (e.g., carrying out color conversion from RGB to CMYK, halftoning, division into bands, addition of required control information, etc.), and send the created print data to the corresponding printer(s) 3A, 3B as indicated by arrow 61 in FIG. 4.

Furthermore, at appropriate time or times, printer driver(s) 35A, 35B acquires or acquire from corresponding printer(s) 3A, 3B the status (e.g., operational status, error status, consumables status, etc.) of printer(s) 3A, 3B and sends or send acquired printer status to print server 34 as indicated by arrow 46. Print server 34 ascertains status with respect to execution of print job(s) sent to printer driver(s) 35A, 35B based on the printer status received from printer driver(s) 35A, 35B. Furthermore, as indicated by arrow 47, print server 34 writes ascertained status of printer(s) 3A, 3B, print job execution status, and other such information to print information database 36 at print server machine 2. As a result, a history of the status of printers 3A, 3B and a history of executed print jobs come to be stored at print information database 36. Moreover, studio user registration information is also managed at print information database 36.

Furthermore, upon receipt of information request(s) from status monitor 14 of client system 5 via file transfer server 31 as indicated by arrow 51, print server 34 as indicated by arrow 47 reads from print information database 36 that information within the error history and history of completed print jobs for printer(s) 3A, 3B which is most recent and has not yet been communicated to client system 5, and sends same to file transfer server 31 as indicated by arrow 51. As has already been described, this most recent error history and history of print jobs for which execution has been completed are immediately transferred to status monitor 14 of client system 5 and are displayed at display monitor(s) of client system 5.

Print information server 37 may for example be a type of WWW server, in which case print information server 37, upon being logged onto (arrow 26) by an entity having registered user privileges from WWW browser 17 of client system 5, may create web page(s) respectively displaying content such as studio user registration information, printer status history or histories, and/or print job execution history or histories stored at print information database 36, and may provide same to such WWW browser 17 as indicated by arrow 25. Furthermore, print information server 37 also has print job history search capability or capabilities, and may receive search request(s) from user(s) from WWW browser 17, may search print information database 36 for print job history or histories requested by user(s), and may return search results to WWW browser 17. Moreover, print information server 37 also has print job control capability or capabilities, receiving control request(s) (e.g., for deletion, changes in priority, number of copies to be printed, and/or other such particulars of job content, etc.) from user(s) from WWW browser 17 for print job(s) waiting to be printed and altering information for such print job(s) within print information database 36. In addition, print information server 37 also has user registration capability or capabilities, and upon being logged onto from WWW browser 17 by an entity having administrator privileges at such photo studio, may register new user information with print information database 36.

Log uploader 38 reads new print information not yet sent to center server machine 8 from print information database 36 at regular intervals (and/or as needed, as the case may be) in accordance with upload schedule(s) (time(s), time interval(s), etc. at which uploading is to be carried out) previously specified by center server machine 8, and uploads same to center server machine 81 as indicated by arrow 63 in FIG. 4.

Furthermore, log uploader 38 has a WATCHDOG MODE for immediately reporting to user(s) abnormalities at photo studio system(s) 1 occurring when user(s) is or are absent or the like. A user wishing to make use of WATCHDOG MODE registers in advance with log uploader 38 the type(s) of abnormality to be reported (e.g., various categories of printer errors, etc.) and email address(es) (e.g., email address(es) for user mobile phone(s)) as desired by the user. Log uploader 38 communicates such registered email address(es) to center server machine 8. By putting log uploader 38 into watchdog mode at time(s) such as when such user(s) will be away from photo studio(s) or the like, upon occurrence of the specified abnormality or abnormalities log uploader 38 immediately communicates the fact of occurrence of such abnormality or abnormalities to center server machine 8. Upon receipt thereof, center server machine 8 creates email reporting occurrence of such abnormality or abnormalities, which it sends to such registered email address(es). This makes it possible for user(s) to be made quickly aware of abnormalities occurring at studio(s) of user(s) even when such user(s) is or are away from such studio(s).

Next, referring to FIG. 4, constitution and function of center server machine 8 will be described.

As shown in FIG. 4, application programs including upload server 81, WWW server 82, and emailer 83 are installed at center server machine 8.

Upload server 81, as indicated by arrow 62, communicates, to log uploader(s) 38 of respective photo studio(s), upload schedule(s) (time(s), time interval(s), etc. at which uploading is to be carried out) managed by center database 84, each studio having its own upload schedule(s), and moreover, receives the most recent print information for such studio(s) sent thereto from log uploader(s) 38 of respective studio(s) in accordance with such upload schedule(s) and stores same at center database 84 of center server machine 8.

Furthermore, at time or times when communication of occurrence of abnormality or abnormalities is received from log uploader(s) 38 of respective studio(s) while in watchdog mode, described above, upload server 81 immediately passes such communication of occurrence of abnormality or abnormalities to emailer 83 by way of center database 84. Upon receipt thereof, emailer 83 immediately creates email reporting occurrence of such abnormality or abnormalities, which it sends, as indicated by arrow 66, to previously registered email address(es) 93 as desired by user(s). This makes it possible for user(s) to be made quickly aware of abnormalities occurring at studio(s) of user(s) even when such user(s) is or are away from such studio(s).

Upon being logged onto from WWW browser 92 installed at some computer machine(s) 91 (e.g., client machine(s) 5A, 5B, dealer machine(s) 9, or other such computer(s), PDA(s), mobile phone(s), and/or the like) by an entity having user, dealer, system-wide administrator privileges, or the like, WWW server 82 reads from center database 84 print information, user information, and/or the like of a range commensurate with privileges with which such entity is logged on thereto, creates web page(s) displaying such information, and sends same to such WWW browser 92 as indicated by arrow 65. What is here referred to as a range commensurate with privileges with which such entity is logged on thereto might for example in the case of user privileges mean "extending only to photo studio(s) of such user(s) and only to such user(s)," or might in the case of dealer privileges mean "extending only to photo studio(s) whose account(s) is or are handled by such dealer(s) and only to user(s) included in such account(s)," or might in the case of system-wide administrator privileges mean "extending to all photo studio(s) and to all user(s)."

Furthermore, also managed by center database 84 in addition to print information and user information of respective photo studio(s) is a variety of information including amounts of consumables used at respective studio(s) as calculated by the center and amounts billed by the center, various news-type communications issued by the center, and so forth. Such information is also communicated to respective user(s) and respective dealer(s) by WWW server 82 and/or emailer 83.

Next, referring to FIG. 3 and FIG. 4, and also to FIG. 5 and following FIGS., operation of photo studio system(s) 1 and center server machine 8 will be described in detail.

First, operation of photo studio system 1 will be described more or less following the sequence of operations at a photo studio.

As shown in FIG. 3, file(s) containing (e.g., JPEG format or TIFF format) photo image(s) taken by digital camera(s) 6 is or are acquired by client system 5 via for example USB from digital camera(s) 6, and is or are stored in user-designated photo folder(s) 12 at client system 5.

Special photo retoucher 11 and/or ordinary photo retoucher 15 is or are launched by user(s) in order to carry out photo retouching operations. The description below applies to the case where special photo retoucher 11 is launched.

Figure 5:
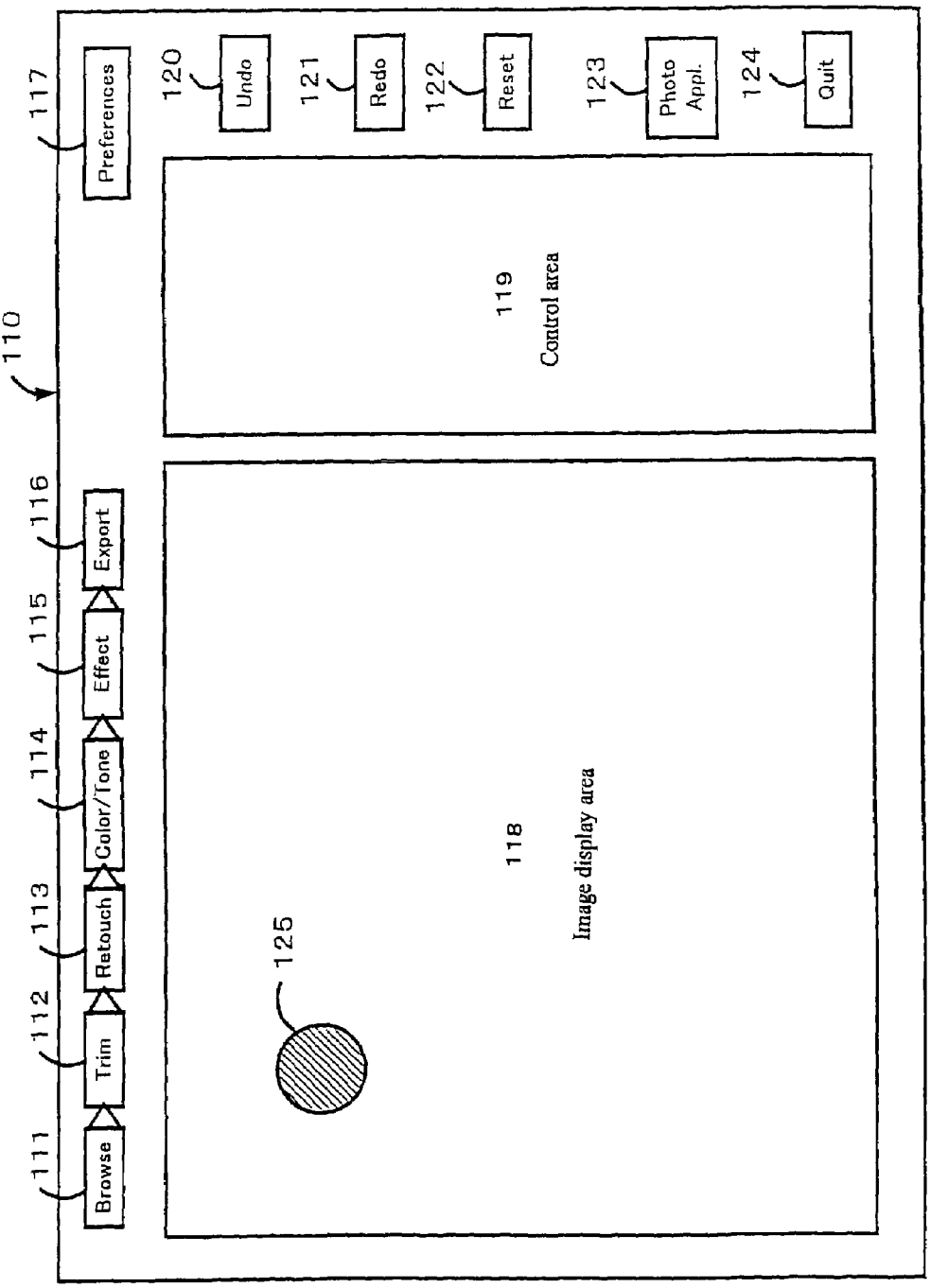
FIG. 5 is a drawing showing retoucher main window 110 of special photo retoucher 11.

Special photo retoucher 11 displays graphical user interface(s) (hereinafter "retoucher main window") 110 such as is shown at FIG. 5 at monitor(s) of client system 5. As shown at FIG. 5, arrayed from left to right at the upper portion of retoucher main window 110 are BROWSE button 111, TRIM button 112, RETOUCH button 113, COLOR/TONE button 114, EFFECT button 115, and EXPORT button 116. The order of arrayal of these buttons 111 through 116 from left to right parallels retouching operational procedure as typically carried out by a user. Such operational procedure is more or less as follows.

To wit, firstly, if BROWSE button 111 is pressed (e.g., by left-clicking a mouse), BROWSE mode is entered, wherein thumbnail images of all of the photo image files within desired photo folder(s) 12 may be browsed and desired photo image file(s) may be selected therefrom. Next, if TRIM button 112 is pressed (e.g., by left-clicking a mouse), TRIM mode is entered, wherein photo image(s) selected while in BROWSE mode may be displayed in its or their entirety and unwanted region or regions other than region or regions of such image(s) which is or are desired to be printed may be cropped away so as to extract only the region or regions of such image(s) which is or are desired to be printed. Next, if RETOUCH button 113 is pressed (e.g., by left-clicking a mouse), RETOUCH mode is entered, wherein desired brush (es) may be used to apply desired modifications at desired location(s) within such photo image(s). Next, if COLOR/TONE button 114 is pressed (e.g., by left-clicking a mouse), COLOR/TONE mode is entered, wherein color adjustment filter(s) may be used to apply desired color adjustment(s) to entire photo image(s). Next, if EFFECT button 115 is pressed (e.g., by left-clicking a mouse), EFFECT mode is entered, wherein special effects filter(s) may be used to apply desired special effect(s) to entire photo image(s). Note that the various types of image processing carried out on photo image(s) at the foregoing TRIM through EFFECT modes is hereinafter referred to as "enhancement."

Lastly, if EXPORT button 116 is pressed (e.g., by left-clicking a mouse), EXPORT mode is entered, wherein file(s) containing such photo image(s) may be saved to desired photo folder(s) 12. Among the ways in which saving may be carried out are two user-selectable methods, one of which is a method wherein photo image file(s) resulting from application to the original photo image(s) of all enhancements carried out at TRIM through EFFECT modes is or are saved, and the other of which is a method wherein file(s) containing description of parameters for all enhancements carried out at TRIM through EFFECT modes is or are saved without any change having been made to the original photo image file(s).

Routinely selecting one mode after the other from BROWSE mode to EXPORT mode and carrying out operations as described above permits facilitation of retouching operations. Furthermore, there is less chance of forgetting to carry out an enhancement which was supposed to have been done. Furthermore, while carrying out operations within the respective modes, at retoucher main window 110 shown in FIG. 5, photo image(s) subject to processing during that step or those steps is or are displayed in image display area 118, and a variety of indicators indicating processing status as well as various tools and console buttons used during that step or those steps are displayed in control area 119.

At the initial BROWSE mode, special photo retoucher 11 automatically (always, unless otherwise requested by the user) causes working ICC profile(s) to be set for photo image(s). The user may personally change working ICC profile settings. But if there is no special specification from the user, special photo retoucher 11 will automatically cause working ICC profile(s) to be set in accordance with default settings. Working ICC profile(s) set at BROWSE mode will be applied to photo image(s) selected while in BROWSE mode when processing proceeds from BROWSE mode to TRIM mode.

Figure 6:
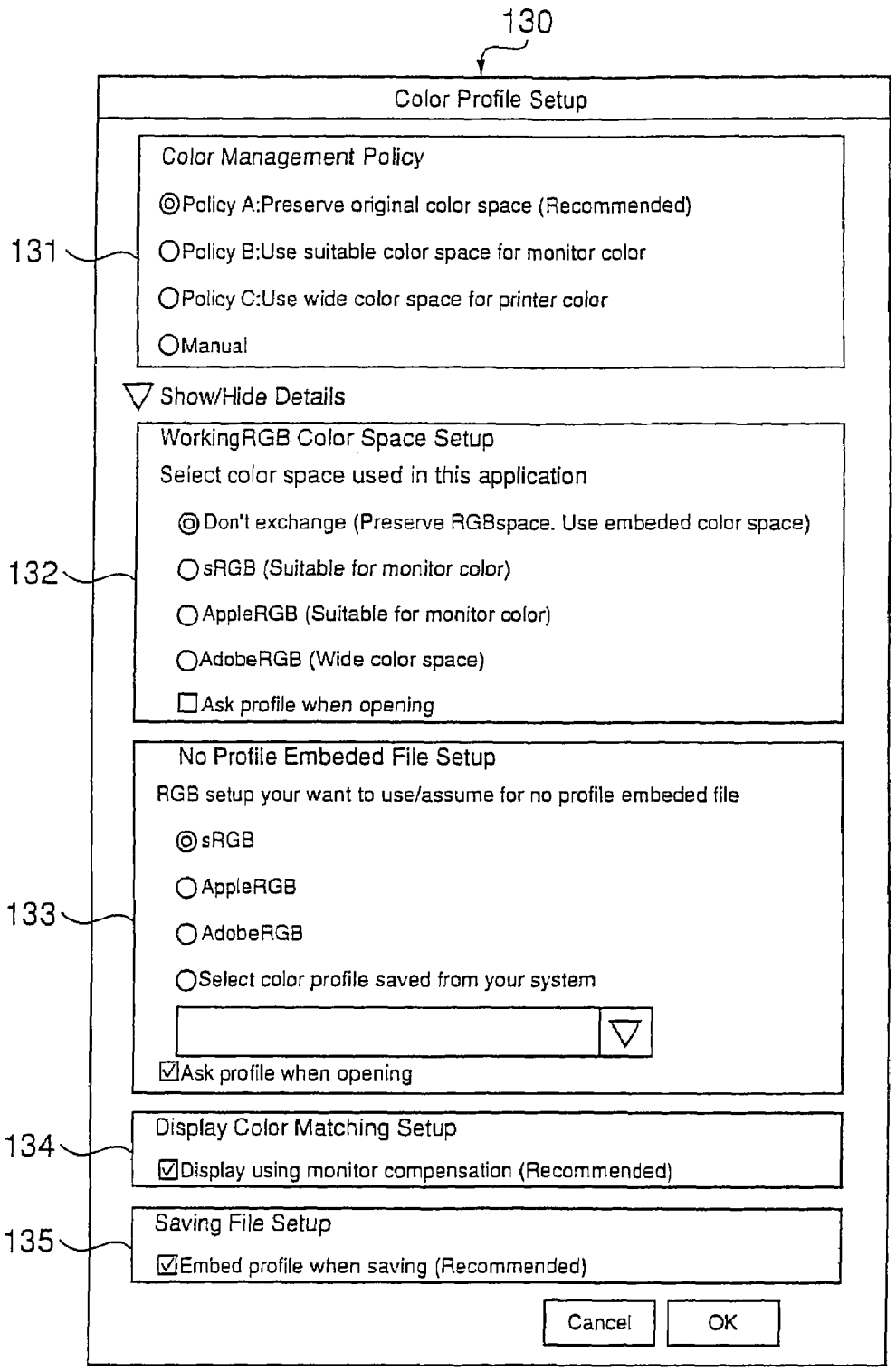
FIG. 6 is a drawing showing COLOR PROFILE SETUP dialog box 130 of special photo retoucher 11.

To personally set working ICC profile(s) and/or confirm current settings, a user presses (e.g., by left-clicking a mouse) PREFERENCES button 117 within retoucher main window 110 while in BROWSE mode. Upon so doing, a COLOR PROFILE SETUP dialog box 130 such as is shown in FIG. 6 is displayed in popup fashion. Note that default profile settings are shown in the example of FIG. 6. At this COLOR PROFILE SETUP dialog box 130, a user may select from among three predetermined color management policies A through C at COLOR MANAGEMENT POLICY field 131. Special photo retoucher 11 will cause working ICC profile(s) to be set which has or have preprepared parameters in correspondence to policy or policies selected here by the user.

The foregoing three policies A through C are such as will now be described.

Policy A causes ICC profile(s) previously embedded in such photo image file(s) to be employed as working ICC profile(s). (While this is not the case for the commonly available types of digital camera,) high-quality digital cameras of the type used by photo studios embed ICC profile(s) indicating the color space(s) of that digital camera in files containing photo images taken therewith and output such files (but note that the majority of the commonly available types of digital camera do not embed an ICC profile). Accordingly, by selecting policy A it is possible to use a color space of a digital camera 6 as a working color space for retouching. In other words, policy A represents settings for when it is desired to print as faithful as possible to the original color of photos taken with a digital camera 6; however, there is no guarantee that colors will be good approximations of each other in going between monitor and printer. Note further that this is the default setting.

Policy B represents settings for when it is desired to print so as to be faithful to the color displayed at monitor(s). For example, the ICC profile of the publicly known "sRGB" color space, corresponding to the color space of a typical monitor, might be set as a working ICC profile. This setting will permit color matching to be carried out between monitor and printer in comparatively proper fashion. In other words, this will allow printout color(s) to be made a good approximation of color(s) displayed at monitor(s).

Policy C causes a standard ICC profile widely employed in the industry—e.g., the ICC profile of the publicly known "AdobeRGB" color space, a wide-gamut standard which is close to printer color space and which has a wider gamut than monitor color space—to be set as a working ICC profile.

Furthermore, by selecting MANUAL at COLOR MANAGEMENT POLICY field 131 of FIG. 6, a user may use fields 132 through 135 therebelow to set desired ICC profile(s) as working ICC profile(s).

First, at WORKING RGB COLOR SPACE SETUP field 132, working ICC profile(s) may be specifically designated. Selecting DON'T EXCHANGE here causes ICC profile(s) previously embedded in such photo image(s) to be employed as working ICC profile(s). Furthermore, respectively selecting "sRGB," "AppleRGB," or "AdobeRGB" causes an ICC profile for the publicly known color space of same name to be set as a working ICC profile.

Furthermore, at NO PROFILE EMBEDDED FILE SETUP field 133, it is possible to set color space(s) to be assumed and used as if it or they were the original ICC profile(s) of photo image(s) in the event that ICC profile(s) is or are not yet embedded in file(s) containing such photo image(s) (e.g., there is often no ICC profile embedded in photo image files acquired from commonly available types of digital cameras). The default setting is "sRGB." "sRGB," "AppleRGB," "AdobeRGB," or any arbitrary ICC profile managed by a color management system at client system 5 may be selected and set in correspondence to user preference.

Furthermore, by placing a check mark in the box next to ASK PROFILE WHEN OPENING (this being the default setting), when any arbitrary photo image file(s) is or are opened (photo image file(s) selected while in BROWSE mode being, for example, opened when processing proceeds from BROWSE mode to TRIM mode), special photo retoucher 111 will force prescribed dialog box(es) for confirming and setting working ICC profile(s) to be displayed in popup fashion if ICC profile(s) is or are not yet embedded in such photo image file(s). This makes it possible to achieve a situation where user(s) will never forget to confirm the type of working ICC profile(s) to be set for photo image(s) in which ICC profile(s) is or are not embedded.

As described above, special photo retoucher 11 always sets working ICC profiles for photo images at the initial BROWSE mode.

Figure 7:
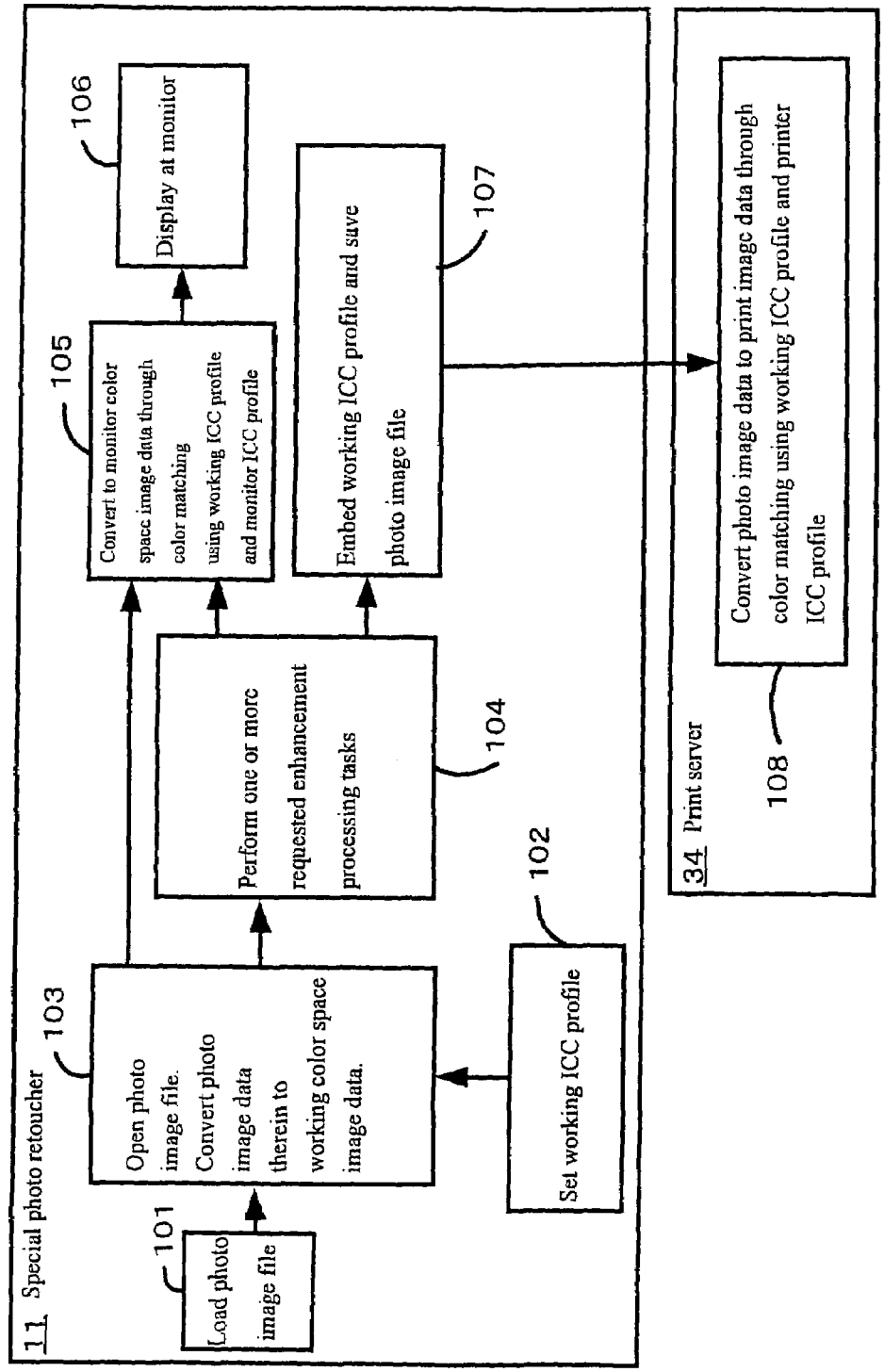
FIG. 7 is a flowchart showing flow of processing for setting of working ICC profile(s) at special photo retoucher 11 and for color matching using such working ICC profile(s).

FIG. 7 shows flow of processing for setting working ICC profile(s) at special photo retoucher 11 as described above, and for using such working ICC profile(s) during color matching between working color space(s) and color space(s) of monitor(s) and/or printer(s) which is carried out thereafter.

At FIG. 7, step 102 indicates setting of working ICC profile(s) in BROWSE mode, described above. Thereafter, when processing proceeds from BROWSE mode to TRIM mode, special photo retoucher 11 reads photo image file(s) selected while in BROWSE mode as indicated at step 101, and opens such photo image file(s) as indicated at step 103. When such photo image file(s) is or are opened, the photo image data thereof may be converted to image data belonging to working color space(s) defined by working ICC profile(s) set at BROWSE mode. At such time(s), if ICC profile(s) previously embedded in such photo image file(s) (or ICC profile(s) assumed as such by special photo retoucher 11) is or are set as working ICC profile(s), no special change is made to the photo image data thereof when such photo image file(s) is or are opened. In contradistinction hereto, if working ICC profile(s) is or are set which is or are different from ICC profile(s) previously embedded in such photo image file(s) (or assumed as such), perceptual color matching may be carried out on such photo image data based on such embedded ICC profile(s) and working ICC profile(s) when such photo image file(s) is or are opened. This color matching permits such photo image data to be adjusted such that color(s) most closely approximating color(s) represented in the color space defined by the previous ICC profile is or are representable in the working color space.

Furthermore, special photo retoucher 11 carries out processing for display of such photo image(s) at display monitor(s). More specifically, as indicated at step 105, special photo retoucher 11 converts such photo image data to image data belonging to monitor color space(s) defined by monitor ICC profile(s) previously prepared and made available at client system 5. At time or times of such conversion, special photo retoucher 11 carries out perceptual color matching for such photo image data making use of the foregoing working ICC profile(s) and the foregoing monitor ICC profile(s) for such photo image data. This permits such photo image data to be adjusted so that color(s) displayed on monitor(s) will be as close as possible to color(s) present in working color space(s). Furthermore, as indicated at step 106, special photo retoucher 11 displays, on monitor(s) (more specifically, at image display area 118 within window 110 shown in FIG. 5), monitor color space photo image data produced by such conversion.

Thereafter, as indicated at step 104, special photo retoucher 11 carries out various enhancements on such photo image(s) as requested by user(s) in TRIM, RETOUCH, COLOR/TONE, and/or EFFECT modes. With every enhancement which is carried out thereon, special photo retoucher 11 performs the foregoing steps 105 and 106 on the post-enhancement photo image(s), displaying such post-enhancement photo image(s) on monitor(s).

Lastly in EXPORT mode, as indicated at step 107, special photo retoucher 11 saves file(s) containing photo image(s) already incorporating various enhancements to user-designated directory or directories (typically photo folder(s) 12 shared by client machines 5A, 5B, for example), at which time working ICC profile(s) for such photo image(s) is or are embedded in and saved with such photo image file(s).

Layout editor 13 thereafter uses photo image file(s) saved in shared photo folder(s) 12 to carry out print layout editing. At such time, except where specifically changed by user(s), layout editor 13 treats as valid and preserves working ICC profile(s) embedded in such photo image file(s), as has already been described. As already described with reference to FIG. 3, such photo image(s) and working ICC profile(s) embedded therein are sent to print server machine 2 following termination of print layout editing and are converted to print image data by print server(s) 34 at print server machine 2. At such time or times, as indicated at step 108 in FIG. 7, print server(s) 34 carries or carry out perceptual color matching on such photo image data using working ICC profile(s) embedded in photo image file(s) and printer ICC profile(s) corresponding to the output printer and output media combination. This permits respective such photo image data to be adjusted, this then being incorporated in print image data, so as to produce color(s) when printed out that will be as close as possible to color(s) present in working color space(s) of such photo image(s).

A series of color matching processing operations such as has been described above permits results such as the following to be obtained.

In the event that ICC profile(s) embedded in photo image(s) by digital camera(s) 6 is or are caused to be set as working ICC profile(s) at the foregoing BROWSE mode, this will result in printed output being obtained which has color(s) satisfactorily approximating color(s) present in subject(s) photographed with digital camera(s) 6. As this is in fact the basic default setting (corresponding to the setting(s) shown by way of example at field 131 and/or field 132 in FIG. 6), user(s) is or are able to automatically obtain the foregoing result even where no particular setting has been entered for ICC profile(s).

On the other hand, in the event that monitor ICC profile(s)—and/or ICC profile(s) like "sRGB" which is or are extremely close thereto—is or are caused to be set as working ICC profile(s), this will result in a printed output being obtained which has color(s) satisfactorily approximating color(s) as displayed on monitor(s). As this is in fact the default setting in the event that there is no previously existing ICC profile(s) (corresponding to the setting(s) shown by way of example at field 133 in FIG. 6), user(s) is or are able to automatically obtain the foregoing result even where no particular setting has been entered for ICC profile(s).

Repeated reference is now made to retoucher main window 110 of FIG. 5.

Upon pressing TRIM button 112 and entering TRIM mode, selected photo image(s) is or are displayed at image display area 1118. By dragging cursor(s) over photo image(s) at image display area 1118, user(s) may cause rectangular selection locus or loci of dimensions as defined by drag start and end points to be set on photo image(s), and may crop away region(s) outside such selection locus or loci so as to extract only region(s) inside such selection locus or loci. If desired aspect ratio(s) is or are previously chosen from control area(s), i.e., from therewithin, then no matter how a user might perform the foregoing drag operation the aspect ratio(s) of the rectangular selection locus or loci set thereby may be automatically controlled so as to have the foregoing chosen aspect ratio(s). Furthermore, control area 119 includes button(s) causing selection locus or loci to be rotated to the right and/or rotated to the left in one-degree increments, pressing which permits selection locus or loci to be rotated to the left and/or rotated to the right in one-degree increments. This permits facilitation of cropping operations.

Next, if RETOUCH button 113 is pressed and RETOUCH mode is entered, photo image(s) as cropped in TRIM mode may be displayed in image display area 118. Displayed at control area 119 there are, within the same screen(s), a number of buttons for selection of prescribed retouching tools frequently used at photo studios; slider bar(s) for adjusting intensity or intensities of enhancement effect(s); list(s) of plurality or pluralities of brushes of different size, degree of blurring, shape, and angle; and a plurality of slider bars for adjusting size, degree of blurring, shape, and angle of respective brush(es). After choosing, at control area 119, desired retouching tools(s), desired enhancement effect intensity or intensities, and brush(es) having desired size(s), degree(s) of blurring, shape(s), and angle(s), user(s) may place cursor(s) at desired location(s) in photo image(s) within image display area 118 and carry out desired enhancement(s) at such location(s). At such time or times, because cursor(s) 125 is or are displayed on photo image(s) within image display area 118 as graphic(s) (e.g., a closed graphic accurately indicating the outline of a brush) having the same size, shape, and angle as brush(es) (i.e., region(s) at which enhancement(s) will be applied) used by user(s), user(s) can accurately ascertain location(s) in photo image(s) at which enhancement(s) will be applied. In the example shown at FIG. 5, a circular cursor 125 of specific size is displayed, this fact signifying that a brush having the same size and shape as this circular cursor 125 is currently being applied to the photo image(s) at the location of this circular cursor 125.

Next, if COLOR/TONE button 114 is pressed and COLOR/TONE mode is entered, photo image(s) with enhancement(s) as applied in RETOUCH mode may be displayed in image display area 118. In this mode, photo image color may be adjusted. This mode may, for example, comprise the three submodes EASY, VARIATION, and MANUAL. At control area 119, submode(s) may be selected as desired from among these three.

Upon selection of the EASY submode, a plurality of selectable choices of preprepared color adjustment filters are displayed in control area 119. Such selectable choices might, for example, include STANDARD COLOR CORRECTION, PORTRAIT PHOTO COLOR CORRECTION, MAKE INTO MONOCHROME PHOTO, LIGHTEN, MAKE HEAVIER, SHARPEN, SOFTEN, and/or the like. By choosing desired selectable choice(s), it is possible to cause prescribed color adjustment filter(s) corresponding thereto to be applied to the entirety or entireties of photo image(s). It is also possible to manually alter parameter(s) of respective filter(s).

Upon selection of the VARIATION submode, parameter setting table(s) for allowing user(s) to freely set values of a prescribed plurality of major parameters (e.g., brightness, contrast, gray balance, saturation, sharpness, and/or the like) from among a variety of parameters for color adjustment filter(s) is or are displayed in control area 119. A desired parameter may be selected from among the foregoing plurality of parameters at such parameter setting table(s). Furthermore, displayed horizontally and vertically in arrayed fashion at image display area 118 there may be, within the same screen(s), a plurality of (e.g., 3, 9, 25, etc.) photo images which respectively represent results of application in trial fashion of a plurality of (e.g., 3, 9, 25, etc.) color adjustment filters having different parameter values to the same photo image(s). The photo image(s) centrally located thereamong represents or represent the result of application in trial fashion of color adjustment filter(s) having parameter value(s) as currently set at control area 119. Furthermore, respectively arrayed in order to either side of central photo image(s) are results of application in trial fashion of color adjustment filter(s) for which parameter(s) selected by user(s) at the foregoing parameter setting table(s) is or are decreased in step(s) of prescribed value(s) from currently set parameter value(s), and conversely, results of application in trial fashion of color adjustment filter(s) for which parameter(s) selected by user(s) at the foregoing parameter setting table(s) is or are increased in step(s) of prescribed value(s) from currently set parameter value(s). Accordingly, user(s) can compare such plurality of photo images differing with respect to color(s), and can easily determine which color(s) is or are most preferred. Upon selection by user(s) of photo image(s) having desired color(s), such selected photo image(s) may automatically be made to move to the center of image display area 118, and parameter value(s) for color adjustment filter(s) applied to such selected photo image(s) may be caused to be set at control area 119. Upon proceeding to other mode(s) and/or other submode(s), color adjustment filter(s) having particular parameter value(s) as set at control area 119 may be automatically applied to photo image(s).

Upon selection of the MANUAL submode, various tools and indicators for even more detailed setting of color adjustment filter parameters than at VARIATION submode are displayed at control area 119, use of which permits more detailed adjustment of color to be carried out.

Upon termination of color adjustment in the foregoing COLOR/TONE mode, by next pressing EFFECT button 115, EFFECT mode is entered, wherein special effects filter(s) may be used to apply desired special effect(s) to entire photo image(s).

As described above, sequential execution of TRIM, RETOUCH, COLOR/TONE, and/or EFFECT modes makes it possible for all enhancements such as might typically be required at a photo studio to be applied without omission to photo image(s).

Now, in the event that during the course of TRIM through EFFECT modes a user decides he or she wants to make use of ordinary photo retoucher 15, all the user need do is press PHOTO APPLICATION button 123 at retoucher main window 110 in FIG. 5. Upon so doing, special photo retoucher 11 saves, to photo folder(s) 12, file(s) containing photo image(s) incorporating results of enhancement(s) performed up to that point in time, and launches ordinary photo retoucher 15 using path(s) of such saved photo image file(s) as parameter(s) for launch command(s), with special photo retoucher 11 itself furthermore becoming inactive. As a result, because ordinary photo retoucher 15 is launched, opening that or those saved photo image file(s), user(s) may use ordinary photo retoucher 15 to carry out subsequent retouching operations. Upon termination of operations with ordinary photo retoucher 15, saving of photo image(s) incorporating the results of such operations to the same photo folder(s) 12 under the same file name(s), and termination of ordinary photo retoucher 15, special photo retoucher 11 automatically becomes active and reopens such photo image file(s), causing ICC profile(s) to again be set for such photo image file(s). As a result, user(s) is or are able to again use special photo retoucher 11 to carry out subsequent operations.

Proceeding finally to EXPORT mode, when user(s) requests or request that photo image(s) be saved, special photo retoucher 11 might, for example, save file(s) containing such photo image(s) to shared photo folder(s) 12, working ICC profile(s) set at BROWSE mode being embedded therein.

With the foregoing, retouching operations carried out on one photo image using special photo retoucher 11 are ended. Retouching operations may thereafter be continued, such operations being carried out on other photo image(s).

Repeated reference is now made to FIG. 3. If print layout editing is to be done, user(s) launch layout editor 13. Layout editor 13 displays graphical user interface(s) (hereinafter "layout editor main window") 140 such as is shown at FIG. 8 at monitor(s) of client system 5.

Figure 8:
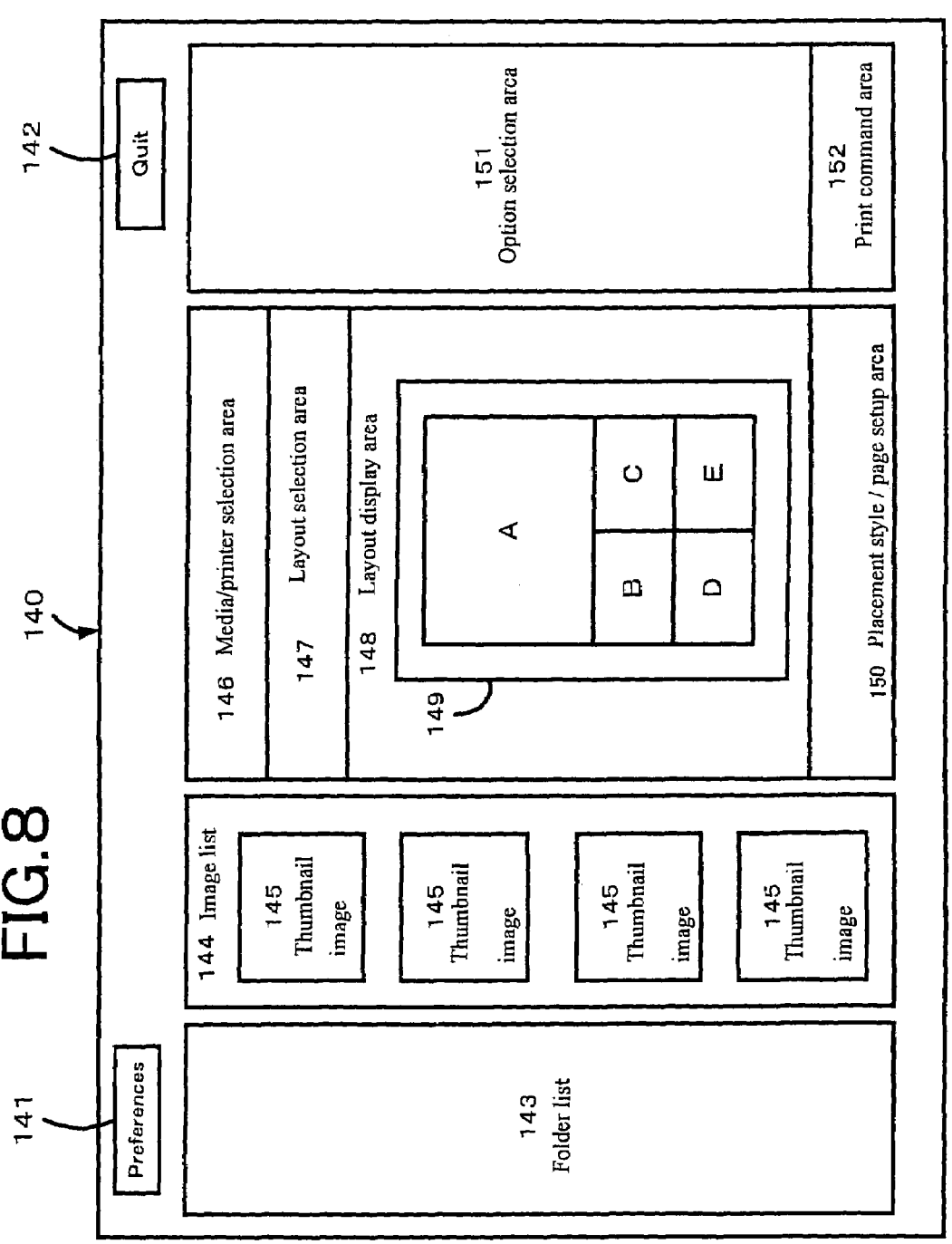
FIG. 8 is a drawing showing layout editor main window 140 of layout editor 13.

As shown at FIG. 8, layout editor main window 140 contains PREFERENCES button 141, folder list 143, image list 144, media/printer selection area 146, layout selection area 147, layout display area 148, placement style/page setup area 150, option selection area 151, print command area 152, and so forth.

Figure 9:
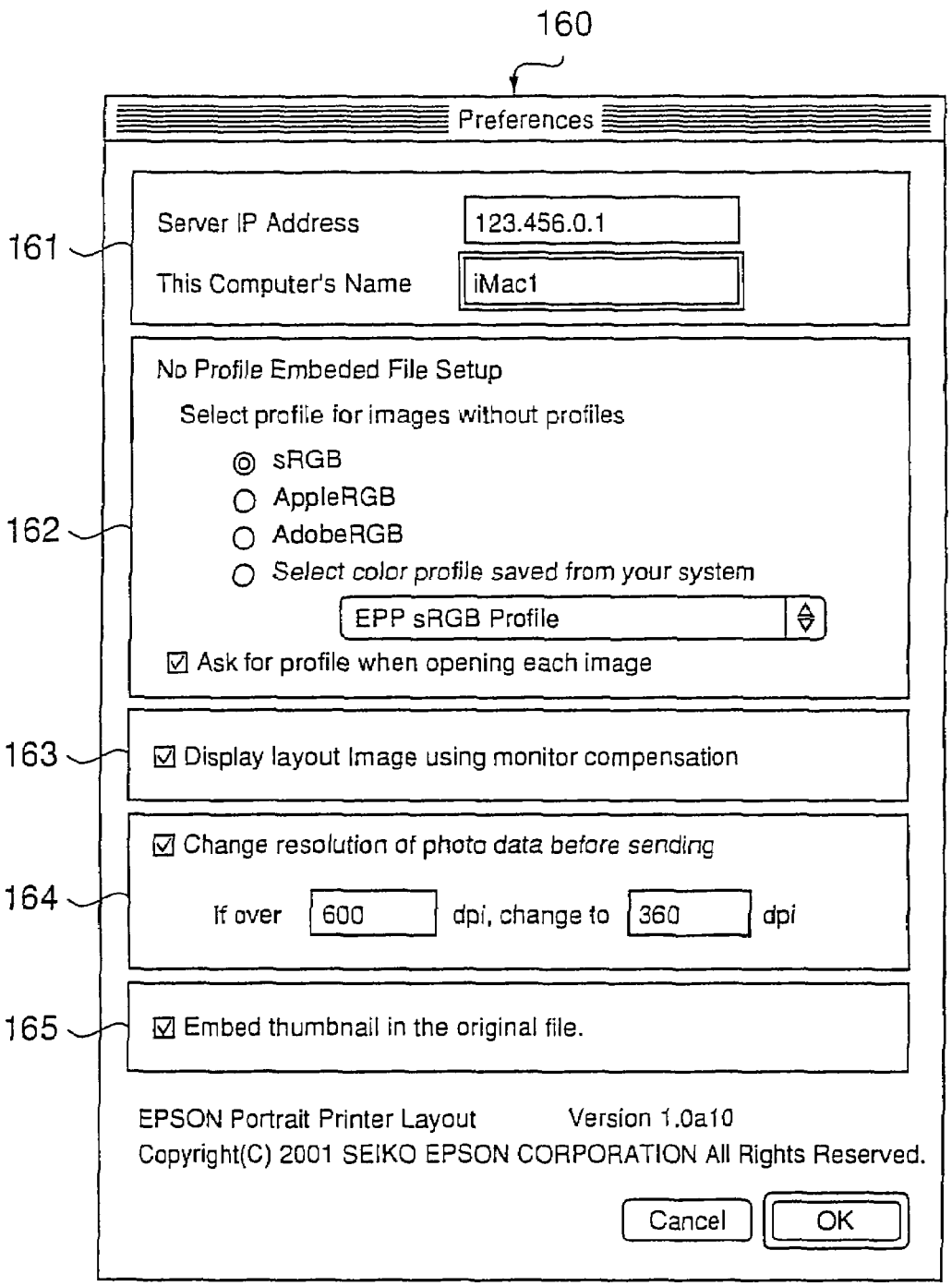
FIG. 9 is a drawing showing PREFERENCES dialog box 160 of layout editor 13.

If PREFERENCES button 141 is pressed (e.g., by left-clicking a mouse), a PREFERENCES dialog box 160 such as is shown in FIG. 9 is displayed in popup fashion. At NO PROFILE EMBEDDED FILE SETUP field 162 of this PREFERENCES dialog box 160, it is possible—just as was the case at field 133 of the same name shown in FIG. 6—to set ICC profile(s) automatically assumed and used as if it or they had been embedded in photo image file(s) in which ICC profile(s) is or are not yet embedded (e.g., the default setting being "sRGB"—corresponding to a typical monitor color space).

List(s) of all folders belonging to client system 5 is or are displayed at folder list 143 within layout editor main window 140. Upon selection by user(s) of desired folder(s) therefrom, thumbnail images 145, 145, . . . for all photo image files saved in such selected folder(s) are displayed at image list 144.

Furthermore, output printer(s) as well as type(s) and size(s) of print media to be used during printing may be specified at media/printer selection area 146. In specifying output printer(s), one of the plurality of printers 3A, 3B shown in FIG. 4 may be specified explicitly, or autoselect (whereby the system automatically selects the most suitable or convenient printer(s)) may be specified. In the event that user(s) specifies or specify particular printer(s) as output printer(s), the system carries out printing of all pages in such job(s) and all sets of copies thereof using only the particular printer(s) specified. On the other hand, in the event that user(s) specifies or specify autoselect, the system automatically selects printer(s) to carry out printing of respective pages and respective sets of copies thereof in correspondence to conditions at printers 3A, 3B. Where autoselect has been specified, it therefore possible that printing of a single job will be distributed across different printers.

Furthermore, at layout selection area 147, list(s) of multiple varieties of layout templates saved in template library folder 32 at print server machine 2 shown in FIG. 3 may be displayed in for example pulldown menu, dialog box, or other such fashion, permitting desired template(s) to be selected therefrom. Selected template(s) is or are acquired by layout editor 13 from template library folder 32 of print server machine 2 shown in FIG. 3 by way of file transfer server 31, and is or are displayed in layout display area 148 at layout editor main window 140 shown in FIG. 8.

Layout template(s) 149 displayed at layout display area 148 occupy space(s) of the same size(s) as print media size(s) selected at media/printer selection area 146, and arrayed therein pursuant to predefined layout(s) there may be one or a plurality of photo frame(s) A through E of standard size(s) standardly used for photo prints.

If desired thumbnail image(s) from image list 144 is or are dragged and dropped by user(s) onto desired photo frame(s) within template(s) 149 at layout display area 148, layout editor 13 will open file(s) containing photo image(s) corresponding to such thumbnail image(s), displaying such photo image(s) such that it or they are placed within such photo frame(s). When placing photo image(s) in photo frame(s), layout editor 13 carries out any required adjustment with respect to photo image dimensions and/or direction, such as changing photo image size and/or direction, cropping portion(s) extending beyond photo frame(s), or adding margin(s) to portion(s) falling short of photo frame size(s), in accordance with placement style(s) set at placement style/page setup area 150, described below. When user(s) have dragged and dropped onto desired photo frame(s) within template(s) 149 all photo images which the user(s) wants or want to print on the same media, print layout/design is completed for that or those print page(s).

When placing respective photo image(s) in respective photo frame(s) within template(s) 149 as described above, layout editor 13 automatically (always, unless otherwise requested by the user) causes working ICC profile(s) to be set for such photo image(s) as described below. To wit, if ICC profile(s) has or have previously been embedded in such photo image file(s), such previous ICC profile(s) is or are caused to be set as working ICC profile(s). If, on the other hand, such photo image file(s) does or do not yet have ICC profile(s) embedded therein, ICC profile(s) set at NO PROFILE EMBEDDED FILE SETUP field 162 in dialog box 160 shown in FIG. 9, described above, is or are treated as if it or they had previously been embedded in such photo image file(s), and such ICC profile(s) treated as if it or they had been embedded therein is or are caused to be set as working ICC profile(s).

At placement style/page setup area 150, style(s) may be set for placement of photo image(s) within respective photo frame(s) at template(s) 149. Setup items include setting(s) pertaining to rotation and setting(s) pertaining to trimming to be carried out if aspect ratio(s) of photo frame(s) and photo image(s) do not match. With respect to trimming styles, either AUTOTRIM (i.e., a style such that photo image(s) is or are made to occupy photo frame(s) without production of margin(s) therebetween by automatically trimming excess regions at either end in the long direction of photo image(s) so as to cause dimension(s) in the short direction of photo image(s) to match dimension(s) in same direction of photo frame(s)) or FIT WITHIN (i.e., a style such that photo image(s) is or are made to occupy photo frame(s) without trimming of photo image(s) by automatically adding margins at either side in the short direction thereof so as to cause dimension(s) in the long direction of photo image(s) to match dimension(s) in same direction of photo frame(s)) may be selected. With respect to rotation styles, either AUTOCLOCKWISE and AUTOCOUNTERCLOCKWISE (i.e., styles such that photo image(s) is or are automatically rotated 90 degrees in respectively clockwise and counterclockwise directions so as to cause the long direction of photo image(s) and the long direction of photo frame(s) to be in the same direction) or MANUAL (i.e., a style permitting 90-degree manual rotation by user(s) in desired direction(s)) may be selected. Because layout editor 13 automatically causes photo image(s) dropped in respective photo frame(s) to be placed in such photo frame(s) using placement style(s) as set here, photo image size adjustment operations are very much facilitated.

At placement style/page setup area 150, where page(s) currently being edited using template(s) 149 will fall within print job(s); i.e., which page(s) therein it or they will correspond to, may also be set. When editing print layout(s)/design(s) of print job(s) comprising a plurality of pages, one need only add page(s) at this placement style/page setup area 150, and, for each respective page, select template(s) as described above, dragging and dropping desired photo image (s) onto respective photo frame(s) therein. Layout editing is thus very much facilitated.

At option selection area 151, optional items may be set with respect to PRINTER OPTIONS, PRINT OPTIONS, and AFTER PRINTING. With respect to PRINTER OPTIONS, when carrying out distributed printing such that the same job(s) is or are printed in distributed fashion across a plurality of printers (if autoselect is specified at media/printer selection area 146, because the system automatically assigns output printer(s) for respective pages and respective sets of copies of such job(s) in correspondence to conditions at printer(s) it is possible that distributed printing could occur), whether the same page(s) is or are to be printed at the same printer(s) and/or whether the same job(s) is or are to be printed at the same printer(s) (whether distributed printing is to be prohibited) may be set. If printing is carried out on the same printer(s), print quality will be the same throughout all sets of copies thereof.

With respect to PRINTER OPTIONS, moreover, whether it is okay to use print media of the same type(s) but of larger size(s) for printing when paper of the specified size(s) is or are not loaded at specified printer(s) may be set. If OKAY is set here, whether print media frame(s) of size(s) corresponding to print media of the specified size(s) should be printed together therewith may furthermore be set. Where it has been set that it is OKAY to use print media of larger size(s) for printing, in order to eliminate uneconomical use of print media the system automatically controls print layout at respective page(s) of print media so as to cause respective page(s) of such job(s) to print at location(s) toward the end(s) of such larger sized print media. If, for example, A4 size was specified for such job(s) but there is no A4 print media, printing instead being carried out on A3 print media which is twice the size thereof, the system would print page(s) of such job(s) in one of two A4-size regions produced as a result of bisection of that A3 print media by the centerline thereof.

Furthermore, with respect to the situation where printing is to be carried out on print media of size(s) larger than specified size(s) as described above, either of the print styles GIVE PRIORITY TO JOB or GIVE PRIORITY TO PRINT MEDIA may be caused to be set in selective fashion at print server machine 2 (or this setting may likewise be carried out at the layout editor). In the event that GIVE PRIORITY TO JOB is set at print server machine 2, because the system gives priority to finishing such job(s) as soon as possible, even if there is or are empty margin(s) remaining on print media of size(s) larger than specified size(s) sufficient to allow printing of other page(s) when printing of particular print job(s) on such larger-size print media is finished (e.g., even where the last page(s) of such job(s) is or are printed on only a region occupying one half of A3 print media, leaving a region in the other half unprinted and empty), such print media is immediately discharged and such print job(s) is or are immediately concluded. On the other hand, in the event that GIVE PRIORITY TO PRINT MEDIA is set at print server machine 2, because the system gives priority to eliminating uneconomical use of such print media, if there is or are empty margin(s) remaining on print media of size(s) larger than specified size(s) sufficient to allow printing of other page(s) when printing of particular print job(s) on such larger-size print media is finished (e.g., where the last page(s) of such job(s) is or are printed on only an A4 region occupying one half of A3 print media, leaving an A4 region in the other half unprinted and empty), other print job(s) of specified size(s) such as is or are capable of being printed in such margin(s) is or are awaited, such print media being discharged only after page(s) of such other print job(s) is or are printed in margin(s) of such print media (e.g., after the first page(s) of subsequent print job(s) is or are printed on A4 region(s) in the remaining half or halves of A3 print media).

Furthermore, with respect to PRINT OPTIONS, whether to print name(s) of file(s) containing respective photo image(s), register mark(s) for respective photo image(s), line(s) indicating external boundary or boundaries of respective photo image(s), studio name(s), client machine name(s), job ID(s), operator name(s), customer name(s), list(s) of name(s) of file(s) containing photo image(s) placed on page(s), print date(s), arbitrary comment(s), and/or other such supplemental information may be set (printing such supplemental information facilitates post-printing operations such as cutting and sorting of printed output by customer). In addition, with respect to any customer name(s) to be printed, list(s) of names of customers previously registered with the system may be displayed in popup fashion and customer name(s) selected therefrom.

Furthermore, with respect to AFTER PRINTING, whether to return job completion communication(s) to server status monitor 14 from print server(s) 34 shown in FIG. 3 after completion of execution of such print job(s) at printer(s), whether to leave data in connection with such print job(s) undeleted at print server machine 2 until deleted or altered by user(s), and other such optional operations to be carried out following completion of printing may be set. Absent a countermanding instruction for deletion from a user or presence of prescribed conditions causing deletion, print server machine 2 is such that print job data is as a rule left undeleted following completion of printing, being stored in disk storage at print server machine 2. Only in the event that the foregoing AFTER PRINTING setting has been set such that print job(s) is or are to be deleted following completion of printing does print server machine 2 delete such print job data, in which case it does so immediately after time or times when printing of such print job(s) is completed.

Moreover, with respect to the foregoing deletion of print job data, AVAILABLE SPACE and TIME PERIOD may be set as conditions for automatic deletion of stored print job data at print server machine 2. Where AVAILABLE SPACE has been set, if available disk storage space at print server machine 2 decreases to such set value(s) or less, print server machine 2 causes deletion of stored print job data, in order of oldness, recovering available disk storage space until it is the foregoing set value(s) or greater. Where TIME PERIOD has been set, print server machine 2 stores print job data for a time period corresponding to such set value(s) (e.g., 7 days), automatically deleting such print job data at time or times when stored time period(s) reach such set value(s). At print command area 152, number(s) of copies to be printed and printing priority or priorities may be specified and execution of printing may be requested. When execution of printing is requested, layout editor 13 generates print job data for print job(s) currently being edited and sends same to file transfer server 31 of print server machine 2 shown in FIG. 3. As has already been described, print job data includes job script(s), layout script(s) for all print page(s) included in such job(s), all photo image(s) placed within photo frame(s) at layout template(s) on such print page(s), and working ICC profile(s) caused to be set for such photo image(s). Note that photo image file(s) included within this print job data is or are not original photo image file(s) but is or are file(s) containing photo image(s) for which adjustment has been carried out with respect to dimension and/or direction during placement in photo frame(s) at layout template(s).

With the foregoing, print layout editing operations carried out on one print job are ended. Print layout editing operations may thereafter be continued, such operations being carried out on other print job(s).

Repeated reference is now made to FIG. 3 and FIG. 4.

At print server machine 2, print job data sent from layout editor 13 of client system 5 is accepted by file transfer server 31 and stored within job folder 33, and furthermore, print job data within job folder 33 is read by print server(s) 34. Based on such print job data, print server 34 creates print image data for all print page(s) making up such print job(s). At such time or times, by carrying out perceptual color matching on such photo image data using working ICC profile(s) for respective photo image(s) and printer ICC profile(s) corresponding to the output printer and output media combination, print server(s) 34 adjusts such photo image data included within print image data so as to produce color(s) when printed out that will most nearly approximate the color(s) present in working color space(s) of such photo image(s). In addition, print server 34 sends the created print image data for respective print page(s) to printer driver(s) 35A and/or 35B for output printer(s). This permits printing to take place at such printer(s).

With respect to output printer selection, print server(s) 34 carries or carry out control as follows based on setting(s) entered at media/printer selection area 146 of layout editor main window 140 shown in the aforementioned FIG. 8 and PRINTER OPTIONS setting(s) entered at option selection area 151 (these settings being written to job script(s)). To wit, if specific printer(s) has or have been specified at media/printer selection area 146, print server(s) 34 uses or use only such specified printer(s) as output printer(s). On the other hand, if AUTOSELECT has been entered for the printer specification at media/printer selection area 146, print server(s) 34 is or are free to select output printer(s) in correspondence to conditions existing at printer(s) at any given time. Furthermore, even where distributed printing is to be carried out, if setting has been made at the aforementioned PRINTER OPTIONS in option selection area 151 to the effect that the same page(s) and/or the same job(s) is or are to be printed at the same printer(s), then print server(s) 34 selects or select the same printer(s) as output printer(s) for all sets of copies of the same page(s) and/or the same job(s).

As has already been described, print server(s) 34 ascertains or ascertain execution status of respective print job(s) and/or status of printer(s) 3A, 3B, recording same at print information database 36. Information pertaining to user(s) at such studio(s) is also recorded at print information database 36.

Status monitor 14 of client system 5 requests information pertaining to errors generated by printer(s) 3A, 3B and/or completion of execution of respective print job(s) from print server machine 2 at time intervals (e.g., every 10 minutes, etc.) previously set by user(s). Responsive to this request, print server(s) 34 at print server machine 2 reads or read from print information database 36 new history information, not yet sent to client system 5, pertaining to completion of execution of print job(s) and/or printer error(s), sending same to status monitor 14 of client system 5 by way of file transfer server 31, and status monitor 14 displays that information on monitor(s) at client system 5.

Print job execution history or histories, status of printer(s) 3A, 3B, and/or user information at print information database 36 may be accessed at any time(s) by means of WWW browser 17 at client system 5. Moreover, administrator(s) at such studio(s) may use WWW browser 17 to register new user(s) at print information database 36.

Furthermore, by putting log uploader 38 of print server machine 2 into WATCHDOG MODE, regardless of whether user(s) is or are present thereat, upon occurrence of error(s) at printer(s) 3A, 3B or other such abnormality or abnormalities; electronic mail to such effect may be sent substantially in real time from center server machine 8 to email address(es) 93 of user(s). Various information managed at center database 84 of center server machine 8 may also be accessed at any time(s) by means of WWW browser 17 at client system 5.

Figure 10:
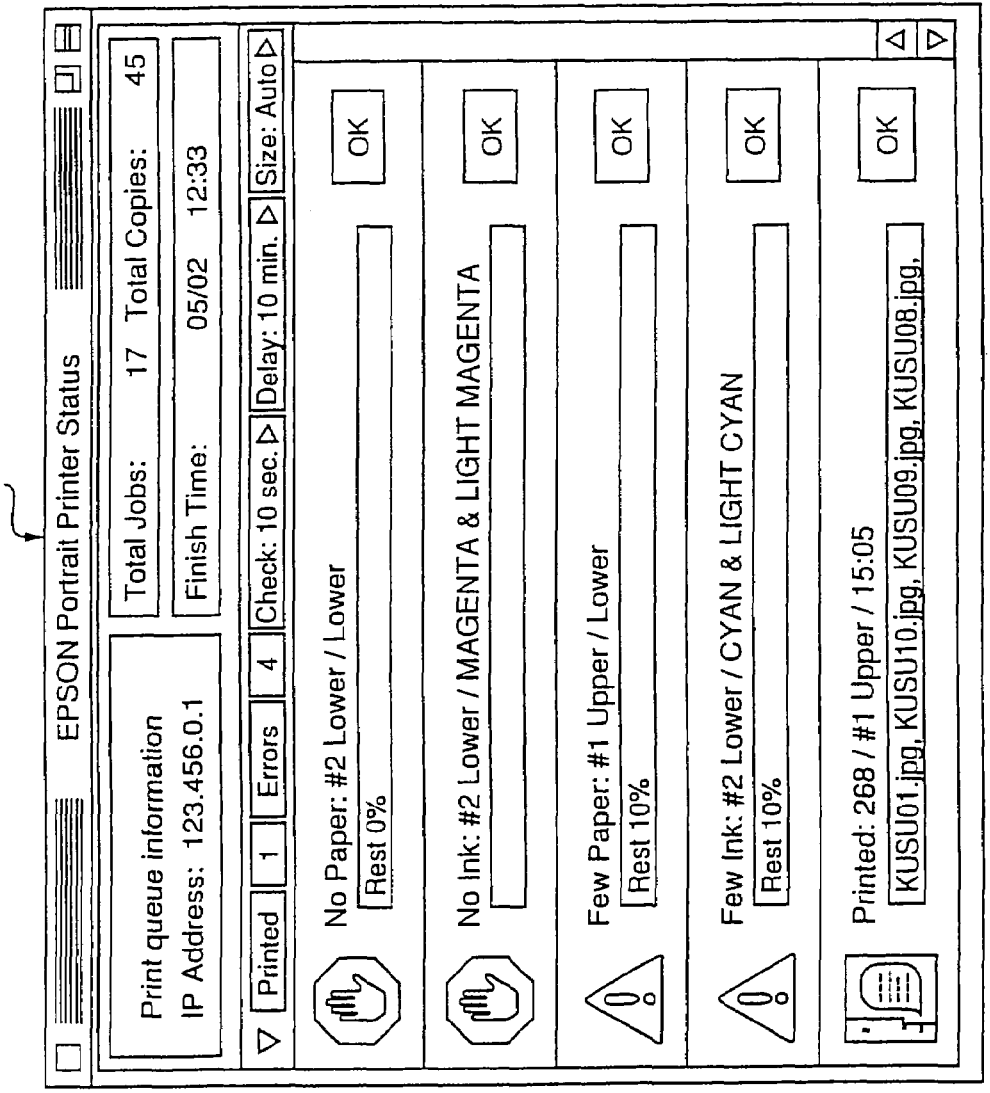
FIG. 10 is a drawing showing an example of printer status window 170 of status monitor 14 at a client machine.

FIG. 10 shows an example of a printer status window 170 displaying a history of completed print jobs and printer errors, such histories being obtained at regular intervals by status monitor 14 at a client machine. Items such as the following may be displayed at this printer status window.

The IP ADDRESS field displays IP address(es) of server(s) to which the machine(s) is or are currently connected. The TOTAL JOBS field displays the total number of jobs waiting to be printed. The TOTAL COPIES field displays the total number of pages waiting to be printed. The FINISH TIME field displays the date and time when it is estimated that printing of the last page will be completed. The MESSAGE DISPLAY ON/OFF button is used to toggle message display ON and OFF. The PRINTED field displays the number of reported print jobs completed. The ERRORS field displays errors and warnings. Pressing the PRINTED button and/or ERRORS button and putting either or both in its ON state causes, where the window was previously inactive, the menu bar to flash if any new message(s) have been added at any of the various categories.

What follows are examples of possible messages which might indicate printer errors. Examples of messages which might have an icon in the shape of a hand include messages indicating that there is no more ink at ink cartridge(s) and/or there is no more print media, that print server operations have stopped, or that a paper jam, communication error, or some other error has occurred, and so forth. Examples of messages which might have an exclamation mark ("!") include messages indicating that ink level(s) is or are low at ink cartridge(s) and/or that print media supply or supplies is or are low, that communication with center(s) is impossible, and so forth. Each message might include icon(s), printer name(s), status(es), color(s) of affected ink cartridge(s), name(s) of affected paper tray(s), amount(s) of remaining ink and/or paper, error details, and so forth.

Examples of messages which might have an icon in the shape of a person's face include messages reporting completion of printing, such reporting of completion of printing occurring only upon completion of printing of jobs for which print completion reporting was set at option selection area 151 in window 140 of layout editor 13 shown in FIG. 8. Such messages might include icon(s), job ID(s), printer name(s), time(s) at which printing finished, printed file list(s) (list(s) of photo image file(s) present within such job(s)), and so forth.

FIGS. 11 through 15 show examples of web pages which might be displayed by WWW browser 17 of client system 5 at times when WWW browser 17 is used to access and/or control various types of information managed by print information database 36 of print server machine 2.

Note that screens showing content substantially similar to the web pages indicated by way of example at FIGS. 11 through 15 might also be displayed at display monitor(s) of print server machine 2.

Figure 11:
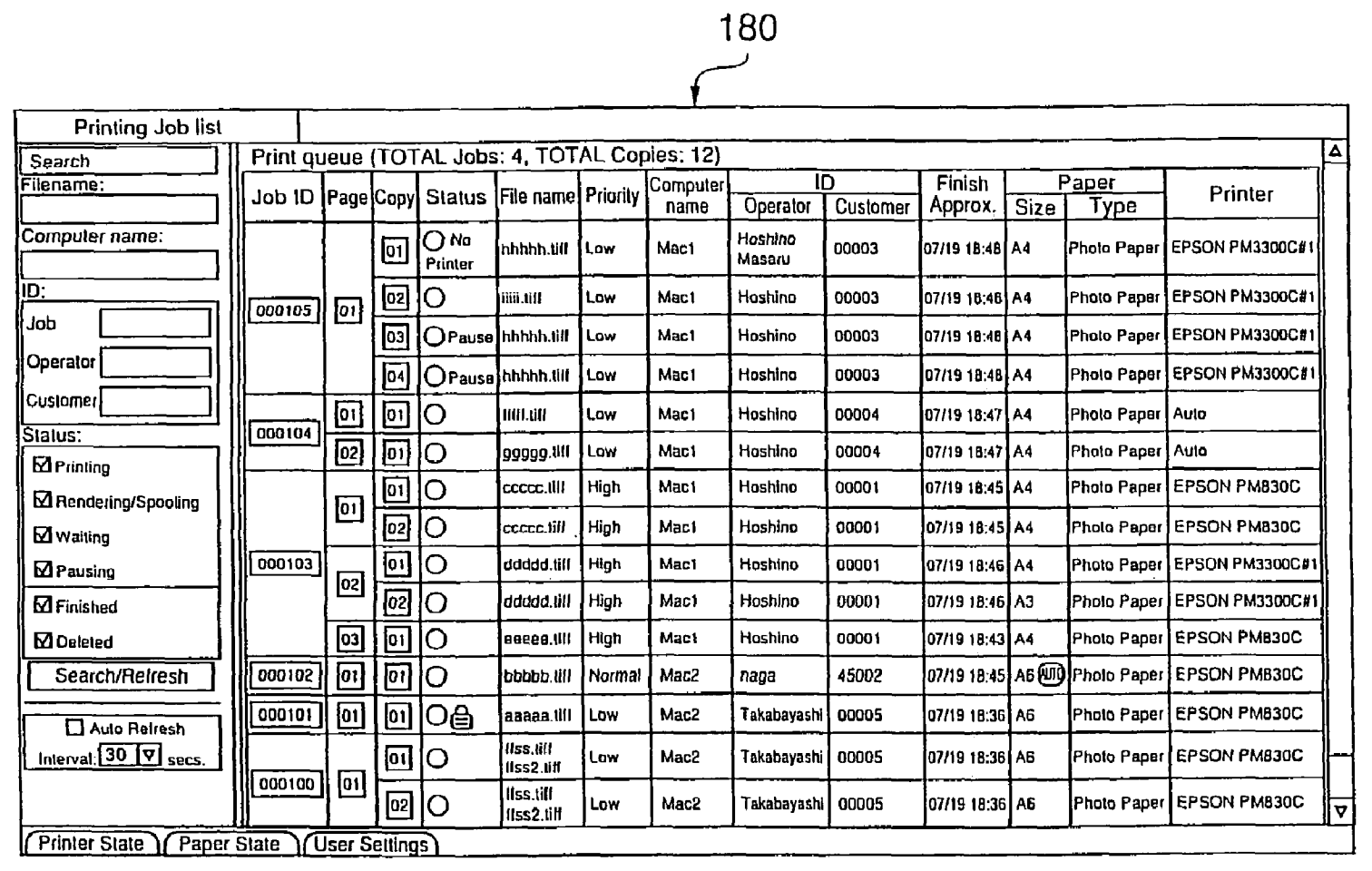

FIG. 11 shows an example of job list page 180 displaying list(s) of print job history or histories.

Displayed as PRINT QUEUE information in the header of the main frame of this job list page 180 are TOTAL JOBS, representing the number of jobs waiting to be printed, and TOTAL COPIES, representing the number of pages waiting to be printed. Furthermore, information related to errors and faults in connection with communication with center(s) or the like may also be displayed. Below that is a list of print jobs, items such as the following being displayed for each print job.

Displayed in the JOB ID column is/are button(s) indicating integer(s) (job serial number(s)) unique to, and uniquely identifying, the print job(s) in question. Displayed in the PAGE column is/are button(s) indicating page number(s) (page ID(s)) assigned to each page present within the respective print job(s). Displayed under COPY is/are the number (Copy ID) of each copy of each page being output. Indicated at each row of the job list is information for each copy being output, permitting user(s) to ascertain the current status of each individual copy being output. Based on what is displayed at JOB ID, PAGE, and COPY, user(s) can ascertain at a single glance the number of pages in each job and the number of copies being output for each page. Moreover, for each respective copy of each page of each job, user(s) can ascertain various types of information such as will be described below.

Figure 12:
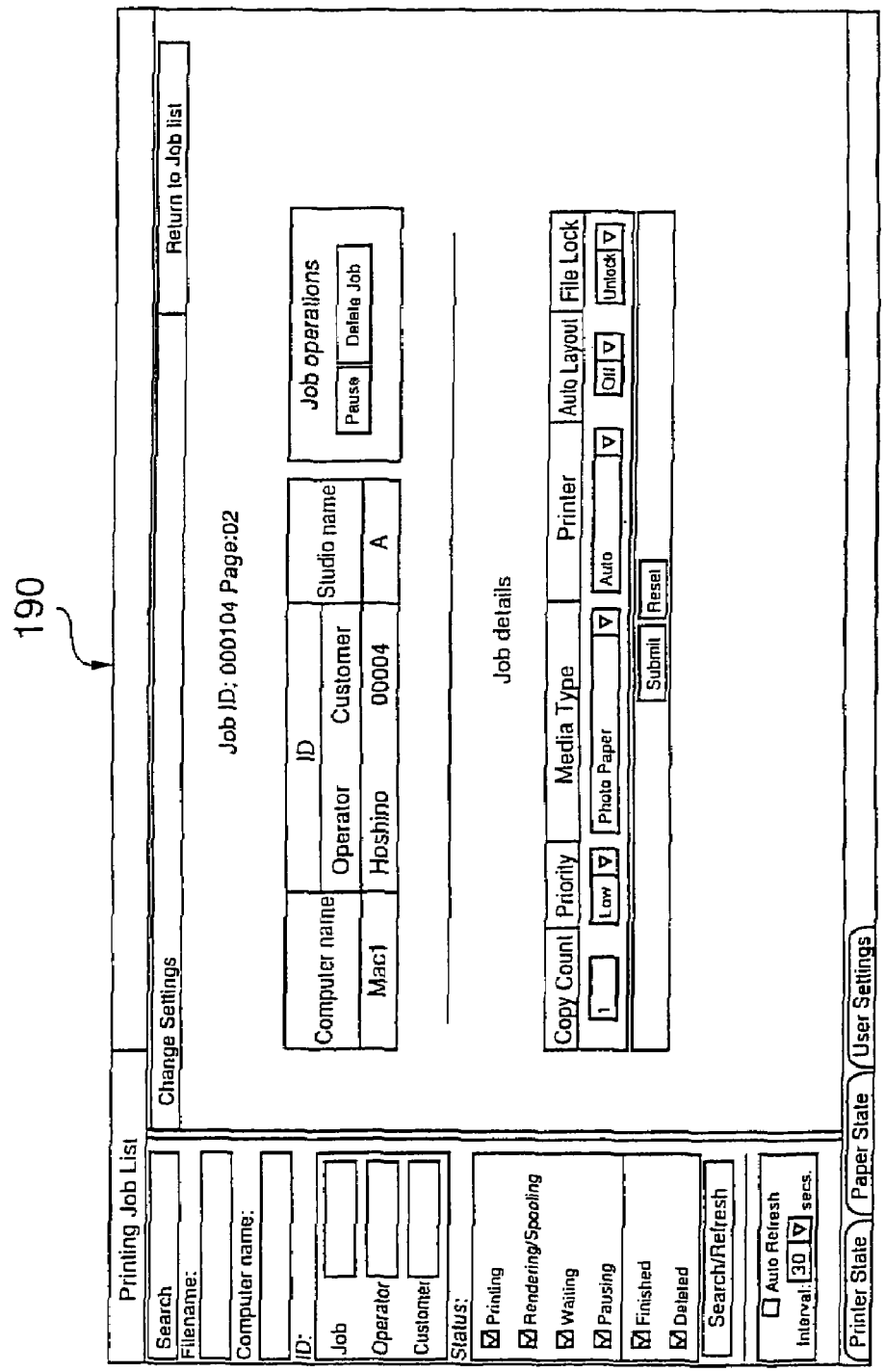
FIG. 12 is a drawing showing an example of a job control page 190 which might be provided to WWW browser 17 from print server machine 2.

Furthermore, if user(s) press (e.g., by left-clicking a mouse) respective JOB ID button(s), respective PAGE ID button(s), and/or respective COPY ID button(s), job control page(s) will be opened for the corresponding respective job(s), respective page(s), and/or respective copy or copies. An example of such a job control page (an exemplary job control page for a specific page of a specific job) is shown at FIG. 12. This will be described in further detail below, but suffice it to say for the present purposes that at job control page(s) for respective job(s), respective page(s), and/or respective copy or copies it is possible to carry out—for that or those job(s), that or those page(s), and/or that are those copy or copies—cancellation of printing (if prior to printing), deletion of data (if after completion of printing), reprinting, pausing, changes in printing conditions (number(s) of copies, priority or priorities, print media type(s), output printer(s), automatic layout, file lock(s), etc.), specification as to how to proceed where printing has terminated due to error (if after completion of printing), and so forth.

Repeated reference is now made to FIG. 11. The STATUS column uses a circular colored icon (depicted simply as a circle in FIG. 11) and character string to indicate the status of each copy of each page in a print job. The color of the colored icon differs in correspondence to status. For example, such a colored icon might be flashing green during printing, green during rendering, yellow while waiting to be printed (during spooling), red when paused, black when printing is finished (data present; reprinting possible), white when printing is finished (data absent; reprinting not possible), and so forth. Where circumstances have caused a job to be stopped, reprinted, or the like, a character string indicating same is displayed. Use of colored icon(s) to display status greatly increases the ease with which user(s) is/are able to ascertain job status as compared with display of character string(s) alone.

Note that in addition to the aforementioned colored icon and character string which are indicative of status, the STATUS column may also display thumbnail image(s) of print image(s) for each page and/or each copy. Doing so will make it easier for user(s) to ascertain the contents of such page(s) and/or such copy or copies. For example, where there is a desire to carry out reprinting of particular job(s) which were printed in the past, looking at such thumbnail image(s) will make it easy to find the job(s) in question. Moreover, it is possible to implement this such that if user(s) press (e.g., by left-clicking a mouse) such thumbnail image(s) of print image(s) which may be presented for each page and/or each copy, thumbnail image(s) of print image(s) included within such print image(s) may be displayed in order. Doing so will make it all the more easy for user(s) to ascertain the contents of such page(s) and/or such copy or copies.

The FILE NAME column displays print data file name(s). The PRIORITY column displays priority; e.g., LOW (low priority), NORMAL (intermediate priority), HIGH (high priority), NOW (print immediately), and so forth. The COMPUTER NAME column displays client machine name(s) (client ID(s)). The OPERATOR ID column displays operator name(s) (operator ID(s)). The CUSTOMER ID column displays customer name(s) (customer ID(s)).

The FINISH APPROX column displays, as date/time, the estimated date and time at which the job will be finished. Such estimated job completion date(s) and time(s) is or are calculated for each copy of each page of each job by print server machine 2. Calculation of such estimated completion times might, for example, be carried out by print server machine 2 based on previously stored standard required printing time(s) per sheet of print media (different values being provided for each print media size) and the number of sheets remaining in print job(s) to be printed at the same printer(s) before printing of the copy or copies for which estimation is being carried out will be completed.

The PAPER SIZE column displays paper size(s). Where automatic layout has been set at option selection area 151 within layout editor main window 140 shown in FIG. 8, the AUTOLAYOUT column will display an AUTO icon indicating same. The PAPER TYPE column displays paper type(s). The PRINTER column displays output printer name(s). Where AUTOSELECT has been entered for the printer specification at media/printer selection area 146 within layout editor main window 140 shown in FIG. 8, because output printer(s) will be automatically selected by server(s), AUTO is displayed in the PRINTER column.

At the SEARCH frame on the left side within job list page 180, items such as the following may be entered as search conditions for searching of print jobs.

At FILENAME, file name(s) may be specified. At COMPUTER NAME, client machine name(s) may be specified. At ID, job ID(s) may be specified at JOB, operator ID(s) may be specified at OPERATOR, and customer ID(s) may be specified at CUSTOMER.

At STATUS, the field of search may be narrowed based on job status. For example, checking PRINTING might cause jobs which are currently being printed to be included in the field of search, checking RENDERING/SPOOLING might cause jobs which are currently being spooled to be included in the field of search, checking WAITING might cause jobs which are currently waiting to be printed to be included in the field of search, checking PAUSING might cause jobs which are currently paused to be included in the field of search, checking FINISHED might cause jobs which are finished printing to be included in the field of search, and checking DELETED might cause jobs which are finished printing and which have been deleted to be included in the field of search. Only jobs having status consistent with the field of search as specified at these STATUS check boxes will be displayed at the aforementioned print job list shown within the main frame of job list page 180. For example, if only WAITING is checked, only those jobs which are waiting to be printed will be displayed in the print job list shown in the main frame of that web page. Note that the default settings for the STATUS check boxes are such that FINISHED and DELETED are unchecked. The reason for this is to reduce the job history processing load at print server machine 2 by eliminating display, at least under the default settings, of information pertaining to jobs which have finished printing (it being possible that a great many jobs might fall into this category).

When the SEARCH/REFRESH button is pressed (e.g., by left-clicking a mouse), print server machine 2 searches print job histories and updates the print job list shown in the main frame of that window with the most recent information found as a result of search. Moreover, it is possible to further narrow the field of search; i.e., to search within the print job list shown in the main frame of that window. Accordingly, only jobs having status consistent with the field of search as specified at the aforementioned STATUS check boxes will be displayed at the print job list shown in the main frame of that window. For example, if only WAITING is checked, only those jobs which are waiting to be printed will be displayed in the print job list shown in the main frame of that web page. Note that the default settings for the STATUS check boxes are such that FINISHED and DELETED are unchecked. The reason for this is to reduce the job history processing load at print server machine 2 by eliminating display of information pertaining to jobs which have finished printing (it being possible that a great many jobs might fall into this category).

If AUTO REFRESH is checked, the most recent job history or histories will automatically be obtained at time intervals set at INTERVAL and this or these will be used to update the print job list shown in the main frame of that web page.

FIG. 12 shows an example of a job control page 190 for controlling print job(s).

As has already been described, at the aforementioned print job list within job list page 180 shown in FIG. 11, pressing desired JOB ID button(s) in the event that there is a desire to change print job settings, pressing desired PAGE ID button(s) in the event that there is a desire to change settings of individual page(s), and/or pressing desired COPY ID button(s) in the event that there is a desire to change settings of individual copy or copies, causes only the main frame of job list page 180 to change, this being replaced by a job control page 190 such as is shown in FIG. 11. FIG. 11 shows an example of a job control page 190 which might be displayed as a result of pressing on desired PAGE ID(s). Displayed in the main frame of job control page 190 are the JOB ID(s), COPY ID(s), PAGE ID(s), etc. which was or were selected as target(s) of control, as well as the following sorts of job control button(s), combination box(es) for changing settings, and so forth.

At the JOB OPERATIONS field, job control button(s) such as the following may be present. The PAUSE/RESUME button is used when pausing print job(s) (causing job(s) to be temporarily halted pursuant to user instruction) and resuming same. PAUSE is displayed at this button when the entire print job(s) is or are waiting to be printed or is or are paused due to system fault or the like, and RESUME is displayed when the entire print job(s) is or are paused. The REPRINT button (not shown in the example at FIG. 11), used to carry out reprinting, is displayed only for those print jobs for which printing has completely finished and only where reprinting is possible (i.e., only in the event that data exists). In the event that reprinting is requested, the job(s) in question is or are again scheduled for printing as new job(s). The DELETE JOB button is used to cancel print job(s) (and to delete saved print job data after completion of printing). This is only displayed when the entire print job(s) is or are waiting to be printed or is or are paused.

At the JOB DETAILS field it is possible, using the following combination boxes, to change detailed settings in connection with job status, conditions, and so forth.

At the PRIORITY combination box, it is possible to change the printing priority or priorities (Now, Hi, Mid, Lo) of the print job(s). At the COPY COUNT combination box, it is possible to change the number of copies of the print job(s) to be printed. At the PAPER TYPE combination box it is possible to change the type(s) of print media to be used for the print job(s), and at the PRINTER combination box it is possible to change the output printer(s) to be used for the print job(s). At the AUTO LAYOUT combination box, it is possible to toggle automatic layout ON/OFF for the print job(s). At the FILE LOCK combination box, it is possible to enable/disable automatic deletion of data for the print job(s). Pressing the SUBMIT button causes changes to settings entered here to be sent to print server machine 2 and to be reflected in the job settings at print server machine 2.

FIG. 13 shows an example of a printer status page 200 for viewing printer status.

At this printer status page 200, list(s) is or are displayed for all printers. Items such as the following may be displayed for respective printer(s).

ENABLE indicates whether the printer is enabled or disabled. PRINTER indicates the name of the printer. STATUS indicates the current status of the printer. PAPER SIZE, MEDIA TYPE, and PAPER LEVELS respectively indicate—for all print media cassettes loaded therein—the print media size, the print media type, and the amount of remaining print media. INK LEVELS indicates the amount of ink remaining. Paper levels and ink levels are displayed in red when they fall below certain values.

FIG. 14 shows an example of a paper status page 210 for viewing status related to paper at printer(s) in particular.

At this paper status page 210, list(s) is or are displayed for all printers. Items such as the following may be displayed for respective printer(s).

PRINTER indicates the name of the printer. PAPER SIZE indicates print media size. MEDIA TYPE indicates print media type. PRINTING# indicates the number of sheets printed during ordinary printing. PRINTING# FOR LOGGING indicates the number of sheets printed during printing of logs. REPRINTING# ON ERROR indicates the number of sheets printed during reprinting caused by occurrence of errors. PRINTING# FOR ADJUSTMENT indicates the number of sheets printed while carrying out print quality adjustments. TOTAL PRINTINGS indicates the total number of sheets printed. As described above, such print media status items may be uploaded from print server machine 2 to center server machine 8, and may be used at center server machine 8 to calculate charges billable to photo studio(s). At such time, neither the number of sheets printed during reprinting caused by occurrence of errors nor the number of sheets printed while carrying out print quality adjustments would be included in the number of sheets used for calculation of charges, but the number of sheets printed during ordinary printing and the number of sheets printed during printing of logs would be included in the number of sheets used for calculation of charges.

FIG. 15 shows an example of a user information page 220 for viewing and/or making changes and/or additions to information pertaining to user(s) at photo studio(s).

Upon being logged onto by an entity having administrator privileges at such photo studio, list(s) of user information for all users at such photo studio might be displayed at this user information page 220 as shown in FIG. 15; or upon being logged onto by an entity having ordinary user privileges, user information for that user might be displayed. Furthermore, upon being logged onto by an entity having administrator privileges at such photo studio, it might be possible at such page to freely carry out registration of new users, deletion of existing users, modifications of user information, and so forth. Upon being logged onto by an entity having ordinary user privileges, it might only be possible to change information at particular items for that user. Items which might displayed at such page are as follows.

USER indicates the name of the user. PASSWORD is a field for entering password(s). CHANGE PRINTER STATE indicates whether the user is authorized to change printer enable/disable settings. SERVER SETTINGS indicates whether the user is authorized to change various settings affecting print server(s) 34. PRINTER ADJUSTMENT indicates whether the user is authorized to perform print quality adjustments (cleaning, bidirectionality, nozzles, chart printing). ADD ERROR LOG indicates whether registration of printing errors in log(s) is authorized for the user. CHANGE PAPER indicates whether the user is authorized to change print media. CONTROL JOB indicates whether the user is authorized to carry out print job control. PERMIT (OWN) means that the user can carry out control only of his or her own print jobs, and PERMIT (ALL) means that the user can carry out control of all print jobs. MAKE TEMPLATE indicates whether the user is authorized to register templates. PRINT indicates whether the user is authorized to carry out printing.

Displayed at SETTINGS are button(s) representing permitted operations for altering user information for respective user(s). The APPLY button is for changing (updating) user information, the DELETE button is for deleting user information, and the APPEND button is for adding (registering) new information. User information for a studio administrator can only be changed, user information for an ordinary user can be deleted or changed, and user information for a new user can only be added.

Repeated reference is now made to FIGS. 3 and 4. As described above, print server machine(s) 2 may provide client system(s) 5 with various types of information in connection with studio business, such as job execution history or histories, printer status history or histories, user registration information, and so forth. Furthermore, as has already been described, center server machine(s) 8 may gather the foregoing various types of information from print server machine(s) 2 of all photo studio(s), web page(s) may be created based thereon at WWW server(s) 82, and such web page(s) may be provided to respective dealer machine(s) 9 and/or client system(s) 5 of respective studio(s). Included among the information which may be provided in the form of web page(s) by WWW server(s) 82 at center server machine(s) 8 is information created at center server machine(s) 8 based on information gathered from print server machine(s) 2; e.g., values tabulated for amounts of consumables used at respective studio(s), history or histories of uploads from respective studio(s), and so forth. Not only is the information which is provided by center server machine(s) 8 extremely important to dealer(s), but it also has value to user(s) quite apart from the information that is provided to them by their own print server machine(s) 2.

Figure 16:
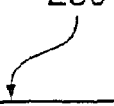
FIG. 16 is a drawing showing an example of a web page for display of consumable (print media in the present example) usage history or histories at respective photo studio(s) such as might be provided by WWW server 82 of center server machine 8.

FIGS. 16 through 18 show examples of a number of web pages which might be provided by WWW server(s) 82 of center server machine(s) 8.

FIG. 16 shows an example of a web page 250 indicating history or histories of usage of consumables at respective studio(s) (while the present example has been presented in terms of print media usage histories, the same sort of thing might be done for ink). The consumables usage history or histories indicated at such page 250 might be prepared as a result of organization by WWW server(s) 82 of consumables usage information extracted from print job usage histories uploaded by respective studio(s). Each photo studio would only be able to access consumable usage history or histories for that studio. Furthermore, each dealer would only be able to access consumable usage history or histories for studio(s) whose account(s) is or are handled by that dealer. As shown in FIG. 16, it is possible to access consumable usage histories for a desired period (from 11 Jun. 2001 to 25 Jun. 2001 in the present example). Consumable usage histories for respective photo studio(s) can be utilized for itemization of amounts billed to such studio(s), as basis or bases for formulation of schedule(s) for delivery of consumables to such studio(s), as input for determining whether such studio(s) are operating in proper fashion, and so forth.

FIG. 17 is an example of a web page 260 displaying a list of photo studios whose accounts are handled by a particular dealer, each dealer being capable of accessing such a list. At this list, any desired photo studio may be selected and the information registered for that studio may be modified or deleted.

FIG. 18 is an example of a web page 270 displaying a list of histories of uploads from photo studios whose accounts are handled by a particular dealer, each dealer being capable of accessing such a list. Displayed at this page 270 are dates and times of last uploads, preestablished upload schedules, and so forth. The dealer can make use of the date and time of the last upload from each photo studio as input for determining whether that studio is operating in proper fashion.

The examples shown in FIGS. 16 through 18 are only a small sample of the web pages which might be provided by center server machine(s) 8. In addition, center server machine(s) 8 may provide photo studio(s) and/or dealer(s) with amounts billed monthly to respective studio(s), various types of news, and a wide variety of other information.

Moreover, center server machine(s) 8 may also carry out a service whereby it or they provide respective print server machine(s) 2 of respective photo studio(s) with printer ICC profile(s) for printer(s) 3A, 3B used at respective photo studio(s). Characteristics of printer(s) 3A, 3B change over time. Center server machine(s) 8 might therefore carry out a service whereby it or they detect changes in characteristics of printer(s) 3A, 3B and update printer ICC profile(s).

Figure 19:
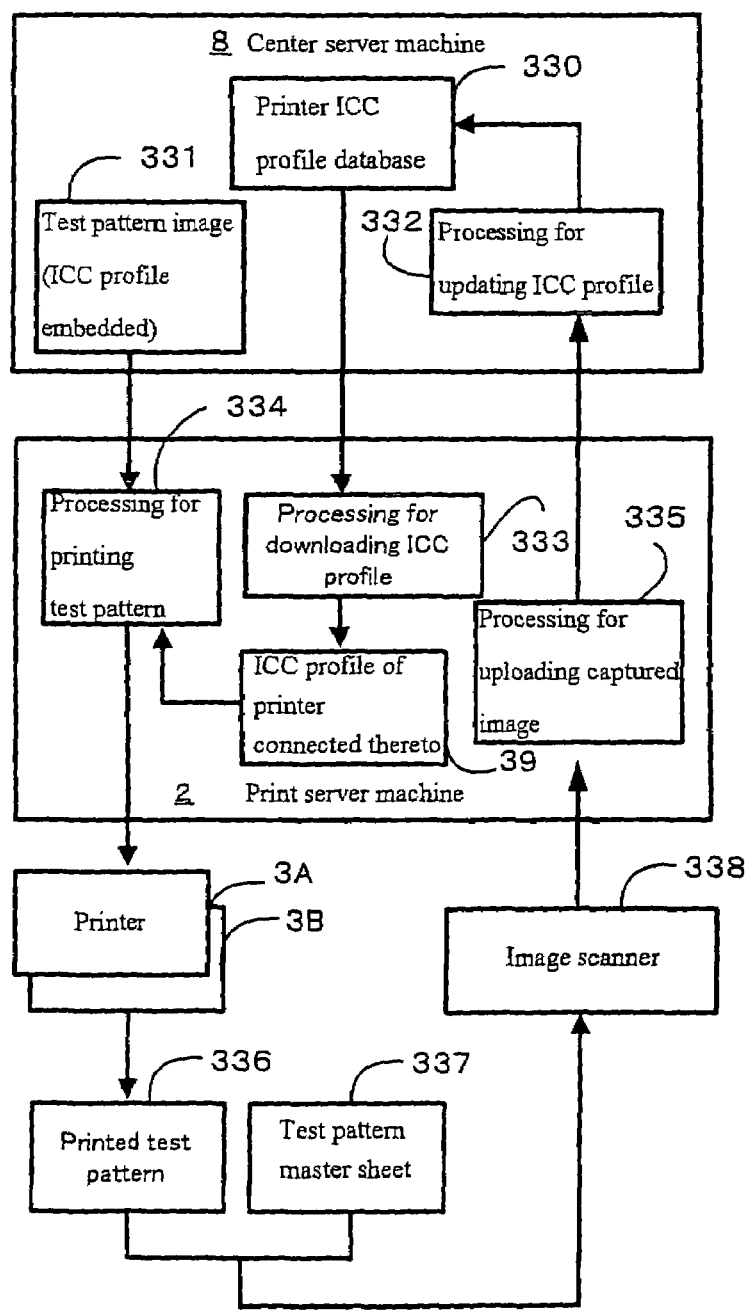
FIG. 19 is a block diagram showing functional constitution of print server machine 2 and center server machine 8 for updating printer ICC profile(s).

FIG. 19 shows functional constitution of print server machine 2 and center server machine 8 for updating printer ICC profile(s).

As shown in FIG. 19, center server machine 8 possesses printer ICC profile database 330, which stores printer ICC profile(s) for all printers respectively installed at all photo studio(s). Stored therein for each respective printer are a plurality of printer ICC profiles respectively corresponding to a plurality of usable types of print media. Printer ICC profile(s) for respective printer(s) are associated with machine number(s) of respective printer(s). At time or times when studio system(s) 1 of respective studio(s) is or are installed, print server machine 2 carries out ICC profile download processing 333. ICC profile download processing 333 is such that machine number(s) of printer(s) 3A, 3B of such studio(s) is or are communicated to center server machine 8, printer ICC profile(s) for such printer(s) 3A, 3B is or are downloaded from center server machine 8, and such downloaded printer ICC profile(s) is or are stored in prescribed folder(s) 39. Thereafter, when creating print image(s), printer ICC profile(s) stored within such folder(s) 39 may be used for color matching.

In order to investigate changes in printer(s) 3A, 3B with time, user(s) may whenever appropriate or at regular intervals execute test pattern printing processing 334, which is installed at print server machine 2. Test pattern printing processing 334 is such that image data for prescribed test pattern(s) is downloaded from center server machine 8. Embedded in downloaded test pattern image data is or are ICC profile(s) indicating color space(s) of such test pattern image data. Test pattern printing processing 334 is such that printer ICC profile(s) corresponding to combination(s) of print media and printer(s) 3A and/or 3B being investigated is or are read from folder(s) 39, perceptual color matching is carried out using such printer ICC profile(s) and test pattern image data ICC profile(s), adjusting such test pattern image data, and such adjusted test pattern image data is used to carry out printing of test pattern(s) at printer(s) 3A and/or 3B being investigated.

Test pattern printout(s) 336 obtained as a result thereof may be sent from studio(s) to the center by mail, for example. At the center, colorimetry may be carried out on such test pattern printout(s) 336, and based on results of such colorimetry new printer ICC profile(s) may be created which indicates or indicate the present color space(s) of printer(s) 3A and/or 3B being investigated, such new printer ICC profile(s) being input to center server machine 8. At center server machine 8, printer ICC profile(s) for printer(s) 3A and/or 3B being investigated which is or are present at printer ICC profile database 330 may be updated to such new printer ICC profile(s). Print server machine 2 thereafter downloads, from center server machine 8, new printer ICC profile(s) for printer(s) 3A and/or 3B being investigated, and updates printer ICC profile(s) for printer(s) 3A and/or 3B being investigated which is or are present within folder(s) 39 to such downloaded new printer ICC profile(s). Print server machine 2 can then use such new printer ICC profile(s).

Moreover, electronic method(s) such as the following may be used as method(s) for sending test pattern printout(s) 336 to the center.

To wit, as shown in FIG. 19, a user at a photo studio mounts test pattern printout(s) 336 and preprepared test pattern master sheet(s) 337 on the platen of image scanner 388, and causes image scanner 388 to scan in such test pattern printout(s) 336 and master sheet(s) 337 in a single image scanning run. What is here referred to as a test pattern master sheet 337 is a sheet on which a test pattern is printed with accurate color(s), same being distributed in advance to respective photo studio(s). Image data captured from printout(s) 336 and master sheet(s) 337 which is output from image scanner 388 may be acquired by print server machine 2, and may be uploaded to center server machine 8 by means of captured image data uploading processing 335. At center server machine 8, ICC profile updating processing 332 is such that any difference in color(s) between test pattern printout(s) 336 and master sheet(s) 337 is detected based on such uploaded captured image data; furthermore, based on results of such detection, new printer ICC profile(s) is or are created which indicates or indicate the present color space(s) of printer(s) 3A and/or 3B being investigated, and corresponding printer ICC profile(s) within printer ICC profile database 330 is or are updated.

Whereas embodiments of the present invention have been described above, these have been presented as examples for purposes of describing the present invention and without intent to limit the scope of the present invention to these embodiments alone. The present invention may accordingly be carried out in the context of a wide variety of other embodiments without departing from the essence thereof.

Whereas in the foregoing embodiments functionality for editing photographs and creating print job and functionality for sending print jobs to printers and managing print information were split between separate computer machines, these being a client machine and a print server machine, such constitution wherein functionalities are split between or among separate machines has been presented only by way of example and it is possible to carry out the present invention in the context of other machine constitutions. For example, all of the foregoing functionalities may be carried out by a single computer machine. Printer(s) may also split a portion of the foregoing functionalities. Or the foregoing functionalities may be split even more finely among even more computer machines.

The invention claimed is:

1. A printing system comprising:
a photo editor configured to cause desired editing operations to be carried out on image data, configured to cause working color profiles indicating working color spaces for editing operations to be automatically set for the image data, and configured to cause, after completion of editing operations, the edited image data to be output with the linked working color profiles;
printers; and
a print controller configured to create print image data using the edited image data and configured to print using the created print image data, and configured to carry out color matching on the edited image data using the working color profile linked to the edited image data and the printer color profile indicating color spaces for the printer when the print image is created;
wherein the photo editor is configured to detect an original color profile linked to the image data, and select the working color profile from one of (1) through (3), below:
(1) the detected original color profile,
(2) color profiles substantially corresponding to color profiles for display monitors, and
(3) user-specified color profiles;
wherein the photo editor is configured to carry out color matching on the image data using the original color profile and the working color profile before beginning editing operations when the original color profile is different from the working color profile.

2. A system according to claim 1, further comprising:
display monitors; and
a display controller configured to output the image data to the display monitor while editing operations are being carried out,
wherein the display controller comprises monitor color profiles indicating color spaces for the display monitor, and is configured to carry out color matching on the image data using the working color profiles and the monitor color profiles.

3. A system according to claim 1 configured such that, unless otherwise requested by a user, one of (1) or (2), above, is automatically selected as the default setting by the photo editor.

4. A system according to claim 1 configured such that, when the original color profile cannot be detected, one of (1) or (2), below: (1) color profiles substantially corresponding to color profiles of the display monitor, (2) user-specified color profiles, is selected by the photo editor and is assumed to be the original color profile.

5. A printing system comprising:
a photo editor configured to cause desired editing operations to be carried out on image data configured to cause working color profiles indicating working color spaces for editing operations to be automatically set for the image data, and configured to cause, after completion of editing operations, the edited image data to be output with the linked working color profiles;
printers; and
a print controller configured to create print image data using the edited image data and configured to print using the created print image data, and configured to carry out color matching on the edited image data using the working color profile linked to the edited image data and the printer color profile indicating color spaces for the printer when the print image is created;
wherein the desired editing operations are retouching operations or print layout editing operations.

6. A system according to claim 5 configured such that
at least either retouching operations or print layout editing operations detect an original color profile linked to the image data, and select the working color profile from one of (1) through (3) below:
(1) the detected original color profile,
(2) color profiles substantially corresponding to color profiles for display monitors, and
(3) user-specified color profiles.

7. A system according to claim 1 or 5 further comprising:
a printer color profile updater, configured to update the printer color profile in correspondence to changes occurring in the printer over time.

8. A printing method comprising:
carrying out desired editing operations on image data;
setting automatically working color profiles indicating working color spaces for editing operations for the image data subject to editing;
after completion of editing operations, outputting the edited image data with the linked working color profiles;
creating print image data using the edited image data, at which time color matching is carried out on the edited image data using the working color profile linked to the edited image data and printer color profiles indicating color spaces for the printer;
detecting the original color profile linked to the image data, and selecting the working color profile from one of (1) through (3), below:
(1) the detected original color profile,
(2) color profiles substantially corresponding to color profiles for display monitors, and
(3) user-specified color profiles;
carrying out color matching on edited image data using an original color profile and a working color profile when an original color profile is different from a working color profile; and
driving printers using created print images.

9. An image editing apparatus comprising:
a photo editor configured to cause desired editing operations to be carried out on image data, configured to cause working color profiles indicating working color spaces for editing operations to be automatically set for the image data, and
configured to cause, after completion of editing operations, the edited image data to be output with the linked working color profiles;
a print controller configured to create print image data using the edited image data and to print using the created print image data, and configured to carry out color matching on the edited image data using the working color profile linked to the edited image data and the printer color profile indicating color spaces for the printer when the print image is created;
wherein the photo editor is configured to detect an original color profile linked to the image data, and select the working color profile from one of (1) through (3), below:
(1) the detected original color profile,
(2) color profiles substantially corresponding to color profiles for display monitors, and
(3) user-specified color profiles; and
wherein the photo editor is configured to carry out color matching on the image data using the original color profile and the working color profile before beginning editing operations when the original color profile is different from the working color profile.

10. A computer readable storage medium comprising a program for causing a computer to execute a process comprising:
a photo editor causing desired editing operations to be carried out on image data, capable of causing working color profiles indicating working color spaces for editing operations to be automatically set for the image data, and capable of causing, after completion of editing operations, the edited image data to be output with the linked working color profiles;
a print controller creating print image data using the edited image data and printing using the created print image data, and carrying out color matching on the edited image data using the working color profile linked to the edited image data and the printer color profile indicating color spaces for the printer when the print image is created;
wherein the photo editor detects an original color profile linked to the image data, and selects the working color profile from one of (1) through (3), below:
(1) the detected original color profile,
(2) color profiles substantially corresponding to color profiles for display monitors, and
(3) user-specified color profiles; and
wherein the photo editor carries out color matching on the image data using the original color profile and the working color profile before beginning editing operations when the original color profile is different from the working color profile.

* * * * *